United States Patent
Ikeda et al.

(10) Patent No.: US 7,251,485 B2
(45) Date of Patent: Jul. 31, 2007

(54) WIRELESS LAN TERMINAL DEVICE, PORTABLE DATA TERMINAL SYSTEM, MOBILE PHONE, WIRELESS LAN COMMUNICATION METHOD, METHOD FOR PROVIDING SERVICE, AND METHOD FOR TRANSFERRING INCOMING CALL

(75) Inventors: Akira Ikeda, Tokyo (JP); Yoshihito Shimazaki, Tokyo (JP); Atsushi Shimbo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 196 days.

(21) Appl. No.: 10/941,008

(22) Filed: Sep. 15, 2004

(65) Prior Publication Data

US 2005/0059391 A1   Mar. 17, 2005

(30) Foreign Application Priority Data

Sep. 17, 2003   (JP) .............................. 2003-324564

(51) Int. Cl.
H04Q 7/20   (2006.01)
(52) U.S. Cl. ................... 455/426.2; 455/572; 455/571; 455/574; 455/575.6; 370/338; 370/390; 370/310
(58) Field of Classification Search ................. 455/44, 455/524, 558; 320/338, 220, 320
See application file for complete search history.

(56) References Cited

U.S. PATENT DOCUMENTS 6,182,204 B1 * 1/2001 Nakashima .................. 712/38
6,259,409 B1 * 7/2001 Fulton et al. ............... 343/702
2004/0058707 A1 * 3/2004 Kobayashi .................. 455/558

FOREIGN PATENT DOCUMENTS

| JP | 10-151274 A | 6/1998 |
|----|-------------|--------|
| JP | 10-271120 A | 10/1998 |
| JP | 2000-224645 A | 8/2000 |
| JP | 2002-261773 A | 9/2002 |
| JP | 2003-110751 A | 4/2003 |
| JP | 2003-023674 A | 1/2004 |

* cited by examiner

Primary Examiner—Joseph Feild
Assistant Examiner—David Q. Nguyen
(74) Attorney, Agent, or Firm—Volentine & Whitt, PLLC

(57) ABSTRACT

A portable wireless LAN terminal device attachable to an external connecting terminal installed in a portable external connection device, such as a portable data terminal device, includes a device body (2); means for transmitting and receiving (6-9) a signal through a wireless LAN circuit, the means for transmitting and receiving being installed the device body (2); means for supplying power (11) to each portion from means for accumulating power installed in the device body (2) or means for accumulating power attachable to the device body (2); a connecting terminal (13) installed in the device body (2) and attachable to the external connecting terminal; and first sound producing means (12, 15), which is installed in the device body, for producing sound based on the signal received by the means for transmitting and receiving (6-9).

20 Claims, 22 Drawing Sheets

Display Example on Screen

WIRELESS LAN TERMINAL DEVICE, PORTABLE DATA TERMINAL SYSTEM, MOBILE PHONE, WIRELESS LAN COMMUNICATION METHOD, METHOD FOR PROVIDING SERVICE, AND METHOD FOR TRANSFERRING INCOMING CALL

BACKGROUND OF THE INVENTION

1. Field of the Invention

The present invention relates to a portable wireless LAN terminal device that is attachable to an external connecting terminal installed in a portable external connection device, such as a portable data terminal device, a portable data terminal system having a portable wireless LAN terminal device and an external connection device, and a mobile phone that is attachable to a portable wireless LAN terminal device.

In addition, the present invention relates to a wireless communication method that uses a portable wireless LAN terminal device, a method for providing service using a portable data terminal system, and a method for transferring an incoming call using a portable wireless LAN terminal device.

2. Background Information

A wireless LAN communication system can be easily constructed by buying a market available personal computer, radio base station, or the like. The aforementioned can provide users with a communication system at a relatively low price. In addition, the data transmission speed of a wireless LAN communication system is high, and is suitable for transmission and reception of a large amount of data. Examples of such a conventional wireless LAN communication system are shown in Japanese Laid-open Patent Publications 2003-110751, 2003-23674, HEI 10-51274, HEI 10-271120, 2002-261773, and 2000-224645, for example, which are hereby incorporated by reference. The especially relevant portions can be respectively found on page 3-4, FIG. 1, page 3-8, FIG. 1, page 2-4, FIG. 1, page 3-5, FIGS. 1-2, page 2-3, FIG. 1, and page 3-9, FIG. 1.

JP2003-110751 discloses a system for communicating using a wireless LAN circuit and a mobile phone circuit of a mobile phone with a wireless LAN terminal function installed therein, or with a PC card, which has a wireless LAN terminal function, attached thereto.

JP2003-23674 discloses a system for IP phone communications through a wireless LAN circuit by a slave unit connected to a PHS master unit as a mobile terminal unit, which has a wireless LAN terminal function installed therein through a PHS circuit or the PHS master unit itself.

JP-HEI 10-151274 discloses a system for a fighting game that can be played in competition with others by communicating between portable game terminal devices, which include a wireless LAN terminal function installed therein through a wireless LAN circuit.

JP-HEI 10-271120 discloses a system with a desktop or notebook personal computer (PC) connected to a wireless LAN terminal device by a cable for communication by selecting an available channel from a plurality of channels, which is divided from the specified frequency band of wireless LAN communication electric waves when the PC and a wireless communicate to a base station through the wireless LAN circuit.

JP2002-261773 discloses a system in which a wireless base station detects whether a wireless LAN terminal device, which is connected to a personal computer (PC) via a cable, has been stolen. The wireless LAN terminal device has a function that measures signal intensity from the wireless base station. When the intensity is lower than a predetermined value, the wireless LAN terminal device transmits a particular packet containing a MAC address to the wireless base station.

JP2000-224645 discloses a system for managing the historical travel of a wireless LAN terminal device by a management device connected to a wireless base station. The wireless LAN terminal device detects self-historical travel, and transmits it to the wireless base station.

In the first three patent references, the devices that perform the function of the wireless LAN terminal are installed in the mobile phone or the mobile terminal device (PHS master unit). However, in such a construction, the power consumption of the mobile phone or mobile terminal device is large. Accordingly, the available time allowed by a battery is relatively short. On the other hand, in order to increase the available time allowed by the battery, a battery with large capacity is required. Thus, the mobile phone and other components may be larger than desired. In addition, a shield for preventing interference between the electric wave of mobile phone circuit, and so on, and the electric wave of wireless LAN circuit is required. This may cause the construction of the mobile phone or the mobile terminal device to be larger than desired.

Additionally, when the PC card type wireless LAN terminal device is connected to the mobile phone or the mobile terminal device and is used, electric power is supplied to the PC card from the mobile phone or the like. Accordingly, power consumption of the mobile phone or the mobile terminal device is large. Similarly, this may exacerbate the above problem. Further, a slot exclusively used for attaching the PC card is required. This may cause the construction of the mobile phone or the mobile terminal device to be even larger.

Since the wireless LAN terminal device disclosed in the fourth or fifth reference does not have a user interface in the wireless LAN terminal device itself, the wireless LAN terminal device is required to be used while connected to a personal computer, or the like. Thus, the wireless LAN terminal device cannot be used in a stand-alone mode. Moreover, JP2000-224645 does not concretely disclose the construction of the mobile unit and how the function of the wireless LAN terminal is achieved.

In view of the above, it will be apparent to those skilled in the art from this disclosure that there exists a need for an improved wireless LAN terminal Device, portable data terminal system, mobile phone, wireless LAN communication method, method for providing service, and method for transferring incoming calls. This invention addresses this need in the art as well as other needs, which will become apparent to those skilled in the art from this disclosure.

SUMMARY OF THE INVENTION

It is an object of the present invention to control and to minimize the size of an external connection device, such as a portable data terminal device, that has components that perform a wireless LAN terminal function added thereto.

It is another object of the present invention to provide a wireless LAN terminal device, which can be connected to an external connection device, such as a portable data terminal device, that is capable of being used in a stand-alone mode.

A portable wireless LAN terminal device in accordance with a first aspect of the present invention is attachable to an external connecting terminal installed in a portable external connection device, such as a portable data terminal device.

The portable wireless LAN terminal device includes a device body, means for transmitting and receiving, means for supplying power, and a connecting terminal. The means for transmitting and receiving transmits and receives a signal through a wireless LAN circuit. The means for supplying power supplies power to each portion from means for accumulating power installed in the device body or means for accumulating power that is removably attachable to the device body. The connecting terminal is installed in the device body and is attachable to the external connecting terminal.

A portable wireless LAN terminal device in accordance with a second aspect of the present invention is the device of the first aspect, wherein the portable wireless LAN terminal device further includes first sound producing means for additionally producing sound based on the signal received by the means for transmitting and receiving.

In the wireless LAN terminal device according to the present invention, since the means for accumulating power is installed in the device body, for example in a built-in manner, or the means for accumulating power is removably attached to the wireless LAN terminal device, the external connection device connected to the wireless LAN terminal device is not required to supply electric power. Thus, an increase of power consumption in the external connection device can be prevented. Accordingly, a battery with a large capacity is not required. Therefore, it is possible to control and to minimize the size of the external connection device.

In addition, when the wireless LAN terminal device includes first sound producing means, the external connection device is not required to supply electric power to the wireless LAN terminal device. Additionally, the external connection device can produce sound based on a signal received through the wireless LAN circuit. Accordingly, the wireless LAN terminal device can be used for calling a user, who carries it alone, for example. Therefore, it is possible to use the wireless LAN terminal device in a stand-alone mode.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 13($b$) is a view of a functional block diagram of the mobile phone type external connection device of the fifth embodiment;

FIG. 14($b$) is a view of a functional block diagram of the portable game terminal device with an external connection device according to the fifth embodiment;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

1-1. Wireless LAN Terminal Device

Figure 1:
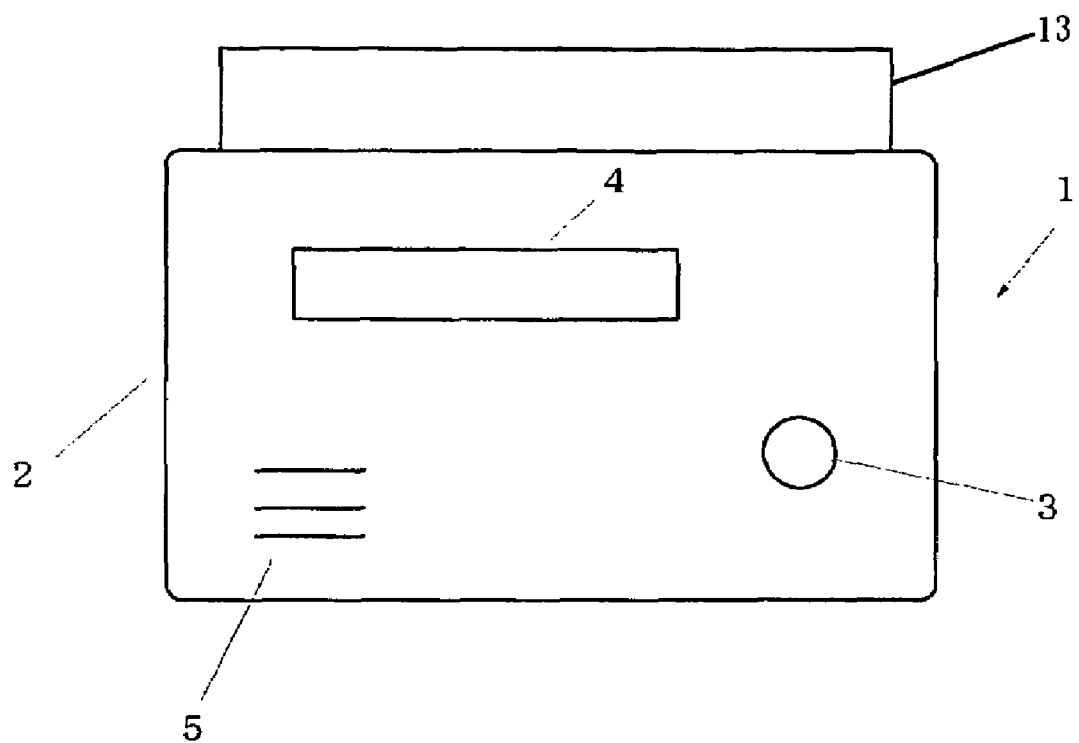
FIG. 1 is an external view of a wireless LAN terminal device in accordance with a first preferred embodiment of the present invention.
Figure 2:
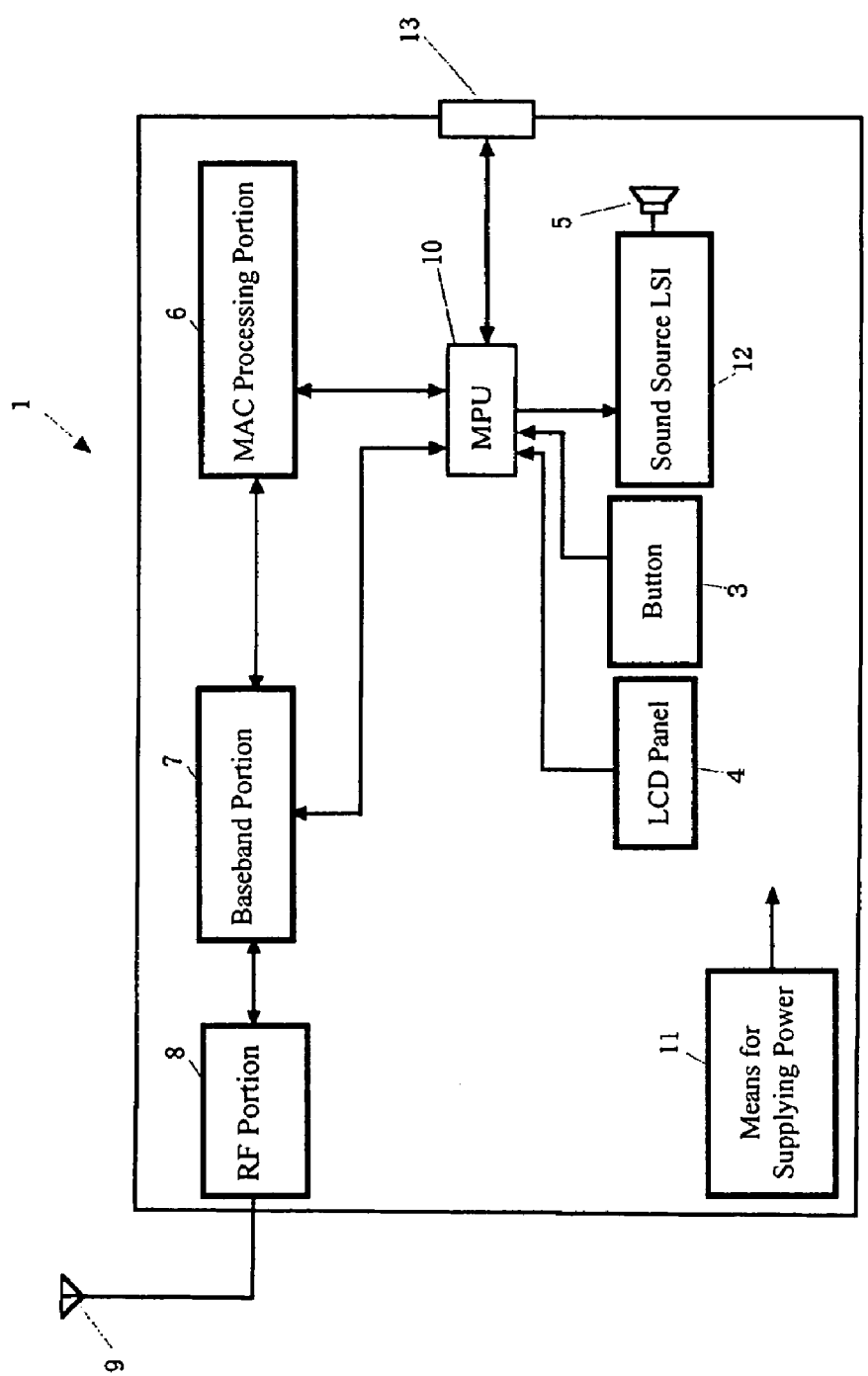
FIG. 2 is a view of a functional block diagram of the wireless LAN terminal device.

FIG. 1 is an external view of a wireless LAN terminal device 1 in accordance with a first preferred embodiment of the present invention. FIG. 2 is a view of a functional block diagram of the wireless LAN terminal device 1. The wireless LAN terminal device 1 (hereinafter referred to as a "terminal device") is a portable wireless LAN terminal device, which can be connected to a portable data terminal, such as a mobile phone or a PDA. The terminal device 1 includes a manual operation button 3 located on the front surface of a device body 2, an LCD panel 4, a speaker 5, and a connecting terminal 13. The arrangement of the manual operation button 3, the LCD panel 4, and the speaker 5 is not limited to this arrangement. They can be located at any suitable position on the device body 2. The manual operation button 3 receives input from a user. The LCD panel 4, which is a means for displaying, displays various kinds of data based on a signal received from wireless LAN circuit. In addition, the LCD panel 4 may display data relating to the terminal device 1 itself, such as the remaining amount of power in a battery, or may display various kinds of data based on the signal received from the connecting terminal 13. Additionally, the means for displaying is not limited to the LCD panel 4. Other display devices may be used as the means for displaying. The speaker 5 converts a sound signal and produces sound. The connecting terminal 13 is directly attachable to an external connecting terminal installed in an external connection device, such as a mobile phone.

The terminal device 1 includes a MAC processing portion 6, a baseband portion 7, an RF portion 8, an antenna 9, and a sound source LSI 12. The MAC processing portion 6 performs processing relating to access control of the party on the other end. The baseband portion 7 performs control of the RF portion 9 and additionally performs control, such as link control, packet control, logical channel control, and security control. The RF portion 8 transmits and receives radio waves of the 2.4 GHz band (based on IEEE 802.11b or IEEE 802.11g), or radio waves of the 5 GHz band (based on IEEE 802.11a) through the antenna 9. The sound source LSI 12 generates a sound signal based on signals from an MPU 10, and provides it to the speaker 5. The MPU 10 receives input from the manual operation button 3. The MPU 10 controls the MAC processing portion 6, the baseband portion 7, the LCD panel 4, and the sound source LSI 12. The MPU 10 transmits and receives signals through the connecting terminal 13. Means for supplying power 11 supplies power to each portion from a battery installed in the device body 2, for example in a built-in manner, or a battery removably attached to the device body 2.

1-2. System

Figure 3:
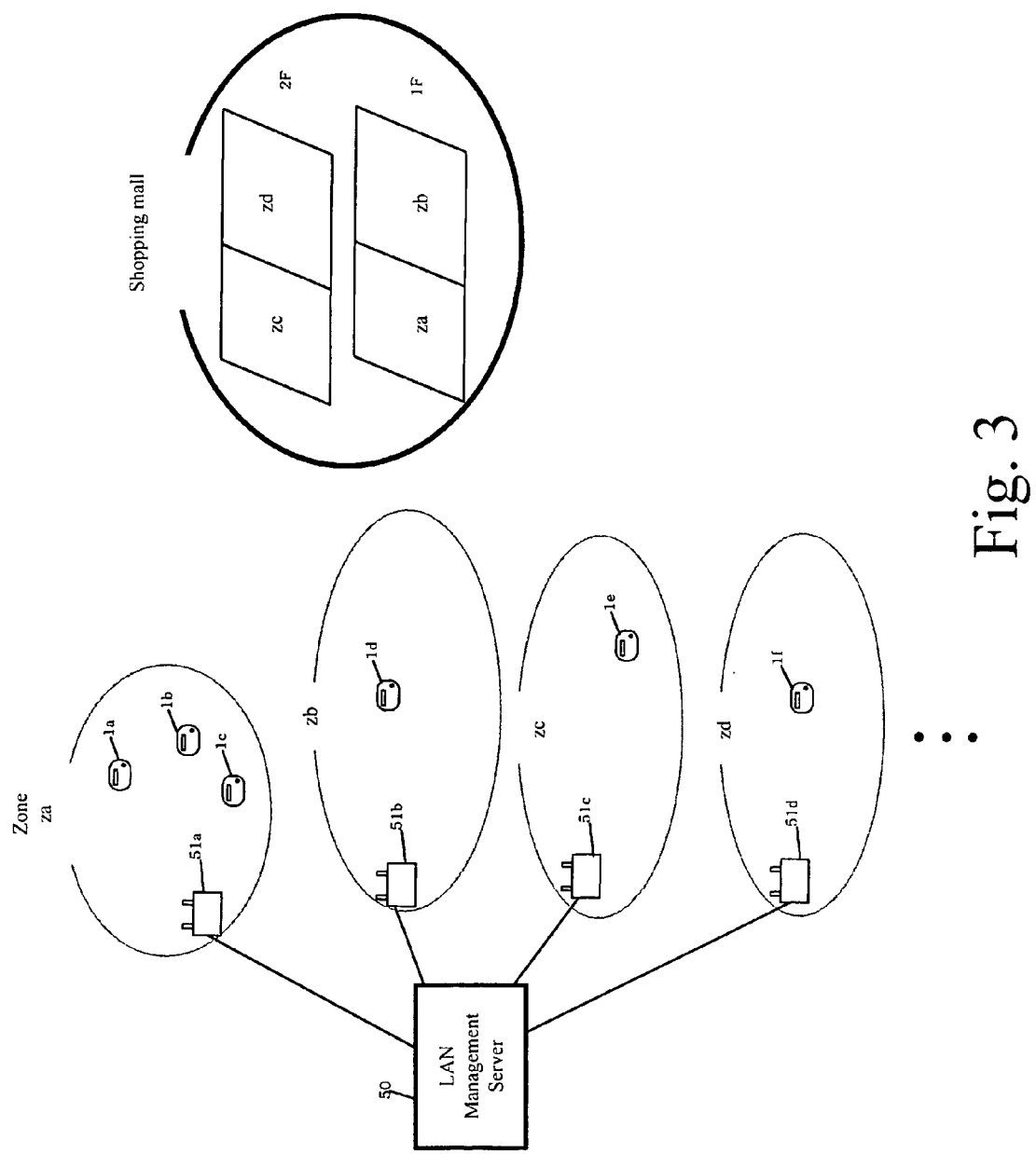
FIG. 3 is a schematic view illustrating the structure of a system for a wireless LAN communication method according the first embodiment in which wireless LAN terminal devices call each other.

FIG. 3 is a schematic view illustrating the structure of a system for a wireless LAN communication method in which wireless LAN terminal devices 1 can call each other. This system as shown in the figure can be provided in a shopping mall, for example. This shopping mall has the first floor and the second floor. Each of zones za-zd is a communication bound area of each of wireless base stations 51a-51d.

A LAN management server 50 is connected to a plurality of the wireless base stations 51a-51d by cable or wireless LAN circuit, and controls the wireless base stations 51a-51d. Each of the wireless base stations 51a-51d is provided in each of the zones za-zd, and communicates with the terminal device 1 in each of zones za-zd through the wireless LAN circuit. Further, it is preferable that the terminal device 1 is securely managed, such as requiring a password to use, so that its IP address cannot be rewritten without permission when the terminal device 1 is lent in the shopping mall or the like. The security function prevents the terminal device 1 from unauthorized use, even if it is carried outside.

Figure 4:
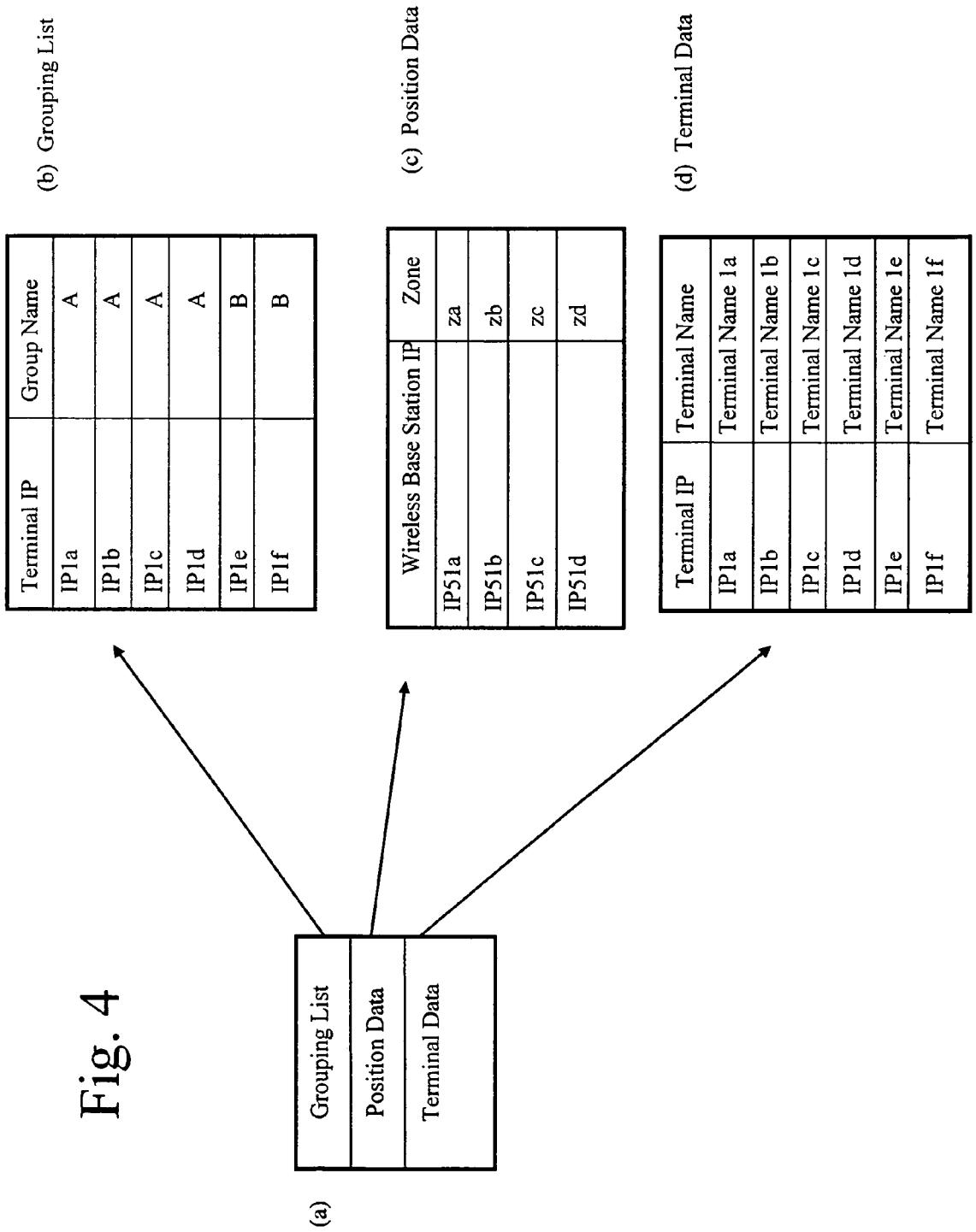
FIG. 4 is a view of an example of construction of data registered into a LAN management server of the wireless LAN system.

Referring now to FIGS. 3 and 4, IP addresses IP1a-1f are allocated to the terminal devices 1a-1d, respectively. IP addresses IP51a-IP51d are allocated to the wireless base stations 51a-51d, respectively. These terminal devices 1a-1f are grouped and registered in the management server 50. These terminal devices are lent to users, who for example visit the shopping mall. The following description will describe a case in which the terminal devices 1a-1d are lent to a group made of a mother, a father, a first child, and a second child, who visit the shopping mall. The terminal devices 1a-1d are registered as a group A. The mother, the father, the first child, and the second child respectively have the terminal devices 1a-1d. The terminal devices 1a-1f are lent at a service counter, etc. of the shopping center. A clerk groups and registers the terminal devices 1 in the management server 50. In addition, the terminal devices 1 may be previously grouped and registered in every one device or two devices. Further, any grouping manner that allows the terminal devices 1 to be registered can be used.

FIG. 4 is an example of the arrangement of data registered into the management server 50. A grouping list, position data, and terminal data are registered in the management server 50 (FIG. 4 (a)). The grouping list registers the IP addresses of the terminal devices 1a-1f and group names related to each other, as shown in FIG. 4(b). As mentioned above, the grouping list may be registered every time the terminal device 1 is lent to a user, or may be previously registered. The position data register the IP address of the wireless base stations 51 and zone names related to each other, as shown in FIG. 4(c). The position data are registered when the wireless base stations 51 are installed. The terminal data register the IP addresses of the terminal devices 1 and terminal names related to each other, as shown in FIG. 4(d). For example, the terminal data are registered when the terminal devices 1 are installed in the system. The terminal device name includes letters, symbols, or the like, which specify each terminal device 1. The terminal device name may include letters, symbols, or the like, which the administrator of the system allocates, or which are the serial number labeled on the device body 2. The terminal device name is labeled on the front surface or elsewhere of the device body 2 whereby the user can recognize it easily.

The following description will describe operation of this system. As shown in FIG. 3, in a case in which the mother, the father, and the first child are in the zone za, and the second child 2 moves to the zone zb. If the child 2 were to need help finding his or her family members because he or she had strayed away from his or her family, for example, the system would provide it. In this case, when the second child presses the manual operation button 3 of the terminal device 1d to call for help, the terminal device 1d transmits a sound producing request signal. The sound producing request signal transmitted from the terminal device 1d is transferred to the management server 50 through the wireless base station 51b of the zone zb.

The management server 50 retrieves the group name (group A) where the IP address IP1d of the terminal device 1d belongs, and extracts the IP addresses IP1a-1c, which belong to (are grouped as) the same group A, with reference to the grouping list. In addition, the management server 50 retrieves the zone (zone zb), where the wireless base station 51b is installed, based on the IP address IP51b of the wireless base station 51b, with reference to position data. Additionally, the management server 50 retrieves the terminal device name (terminal name 1d), whose IP address is IP1d, with reference to the terminal data. Then, the management server 50 transmits the sound producing request signal, the position data (zone zb), and the terminal device name (terminal name 1d) to the other terminal devices 1a-1c (IP1a-IP1c) of the group A, to which the terminal device 1d belongs.

Figure 5:
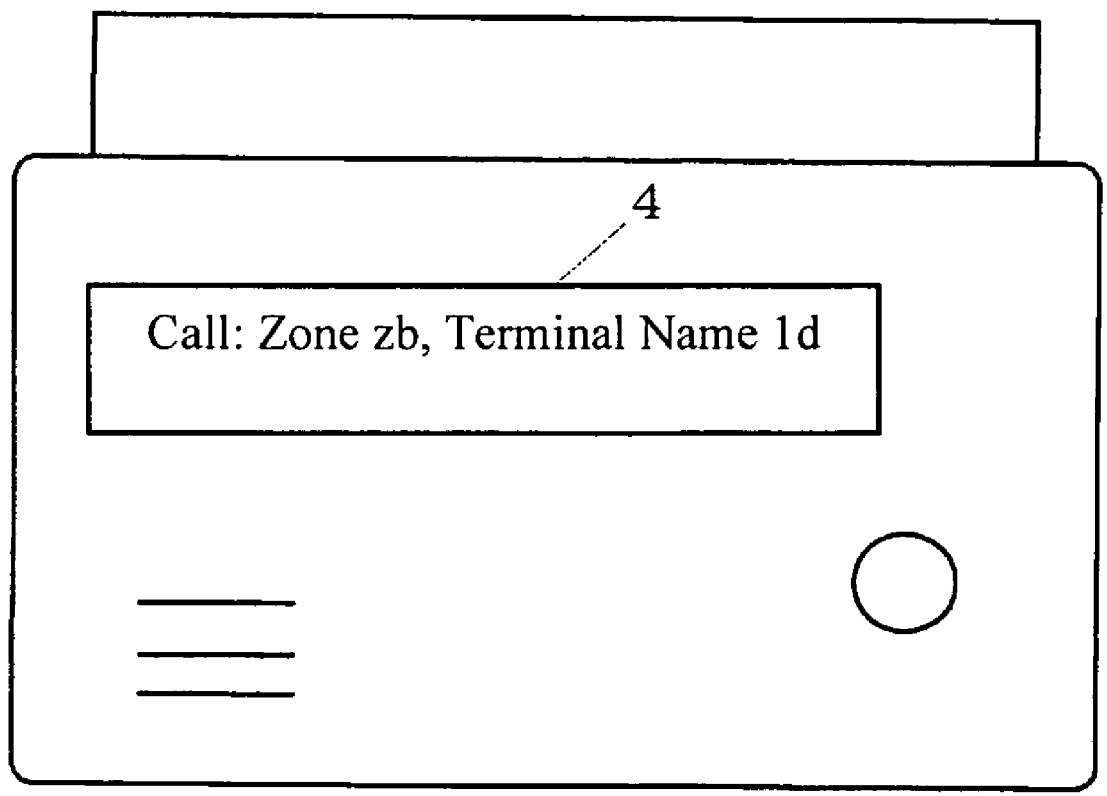
FIG. 5 is a view of an example of a display on a screen of the wireless LAN terminal device.

When the terminal devices 1a-1c receive the sound producing request signal, the position data (zone zb), and the terminal device name (terminal name 1d), which were transmitted through the wireless base station 51a by the management server 50, the sound source LSI 12 generates an alarm sound or melody (music) sound signal based on the sound producing request signal, and provides it to the speaker 5. In addition, each of the terminal devices 1a-1c displays the terminal device name (terminal device 1d) and position data (zone zb) with a calling sign, which indicates the device had been called, on the LCD panel 4, as shown in FIG. 5.

The mother, the father, and the first child, who respectively have the terminal devices 1a-1c, can be informed who in their family called them by the alarm sound, or the like, produced from the speaker 5. In addition, the data displayed on the LCD panel 4 inform, "the child 2 in the zone zb called."

Referring again to FIGS. 3 and 4, in addition, in the case that the first child having the terminal device 1c strays away from the mother and the father within the zone za, when the first child presses the manual operation button 3 of the terminal device 1c, he or she can similarly call the users having other terminal devices 1a, 1b, and 1d. On the other hand, the mother or the father as the guardian can also call the terminal device 1c or 1d, which is carried by the first or second child. That is, when the manual operation button 3 of the terminal device 1 is pressed, the alarm sound, or the like, can be produced by the other terminal devices, which belong to the same group.

In the above description, the one terminal device 1 calls other terminal devices 1 through the management server 50. However, the terminal devices 1 may directly communicate with and call each other through the wireless LAN circuit when the terminal devices 1 can directly communicate with each other. Moreover, the LCD panel 4 may be omitted in the above terminal device 1. Even if the LCD panel 4 is omitted, one terminal device 1 can cause the sound source LSI 12 and the speaker 5 of the other terminal devices 1 to produce the alarm sound, or the like, for calling the other terminal devices 1.

According to the above system, in the case that users such as a family group visit the mall, etc., when one or two members of the family want to call other members, pressing the manual operation button 3 of the terminal device 1 can call other members of the family. In addition, since pressing the manual operation button 3 to call the other members of the family is a very simple operation, even a small child who has strayed away from the family can perform the operation.

1-3. Operation/Working-Effect

As shown in FIG. 2, in the above terminal device 1, the means for producing sound (the sound source LSI 12 and the speaker 5) is installed as a user interface in the device body 2, and the means for supplying power 11, which supplies electric power to each portion, is provided in the device body 2. Accordingly, the terminal device 1 can be used in a stand-alone mode for calling without being connected to an external terminal device, such as a PDA and a PC, to achieve a user interface.

Additionally, as shown in FIG. 5, since the terminal device 1 has the LCD panel 4, the called terminal device 1 can display the calling terminal device name and the position data of the terminal device 1 on the LCD panel 4 of the called terminal device 1. Thus, the user with the called terminal device 1 can be informed who is calling and where the caller is. Moreover, a panel with a large area may be used as the LCD panel 4 in order to display a map showing the position of the calling terminal device 1.

Referring again to FIGS. 3 and 4, in the system constructed by using the above terminal device 1, merely preparing the management server 50, the wireless base station 51, and the terminal device 1 as a single unit operative alone can realize a call system with the wireless LAN circuit. Such a system can be simply constructed at a low cost. Therefore, it is possible to provide such service to users at a low price or for free.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

ALTERNATE EMBODIMENTS

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Embodiment 2

Figure 6:
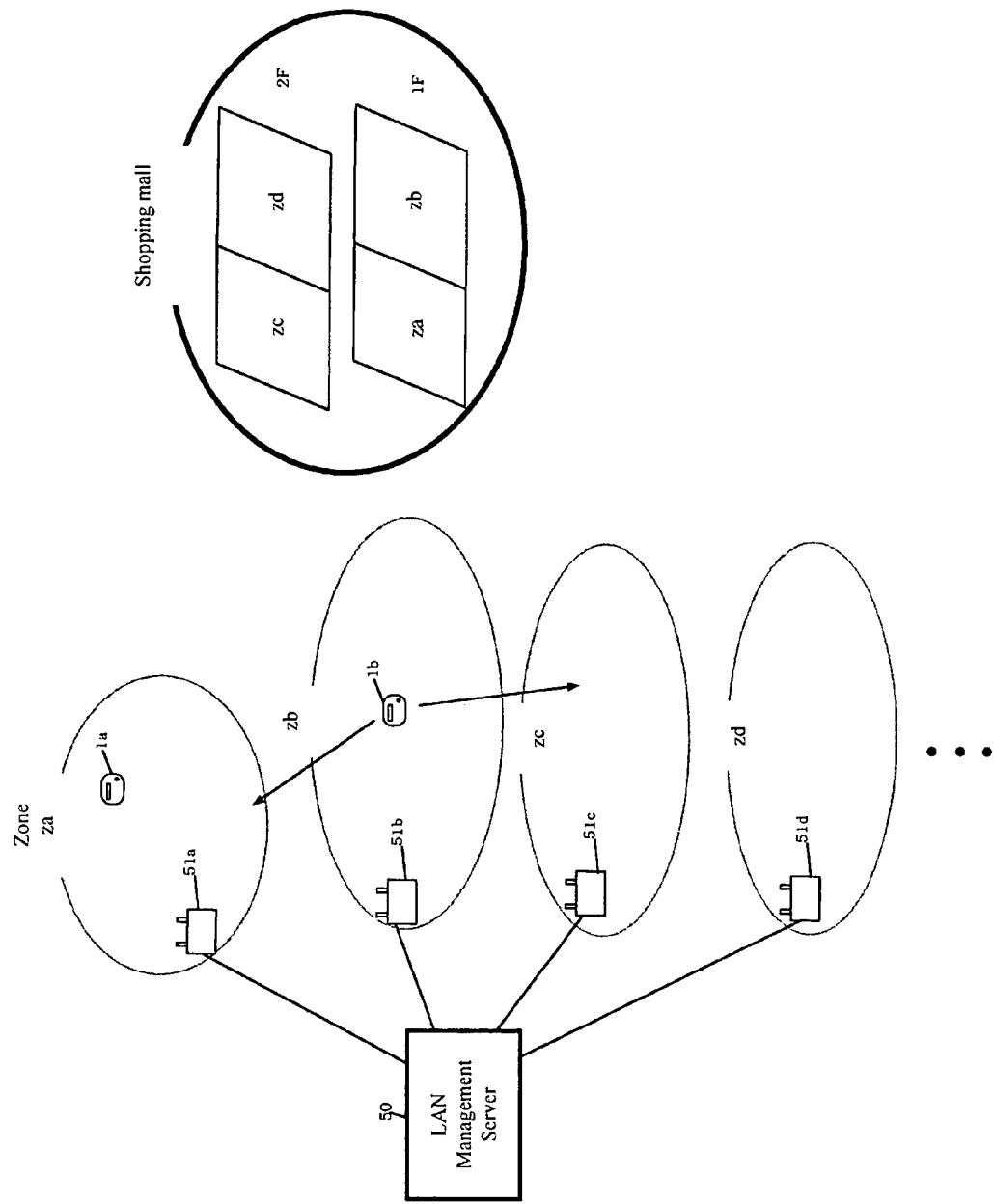
FIG. 6 is a schematic view illustrating a first aspect in the structure of a system for a wireless LAN communication method, which defines a travel bound area of a wireless LAN terminal device, in accordance with a second preferred embodiment of the present invention.
Figure 7:
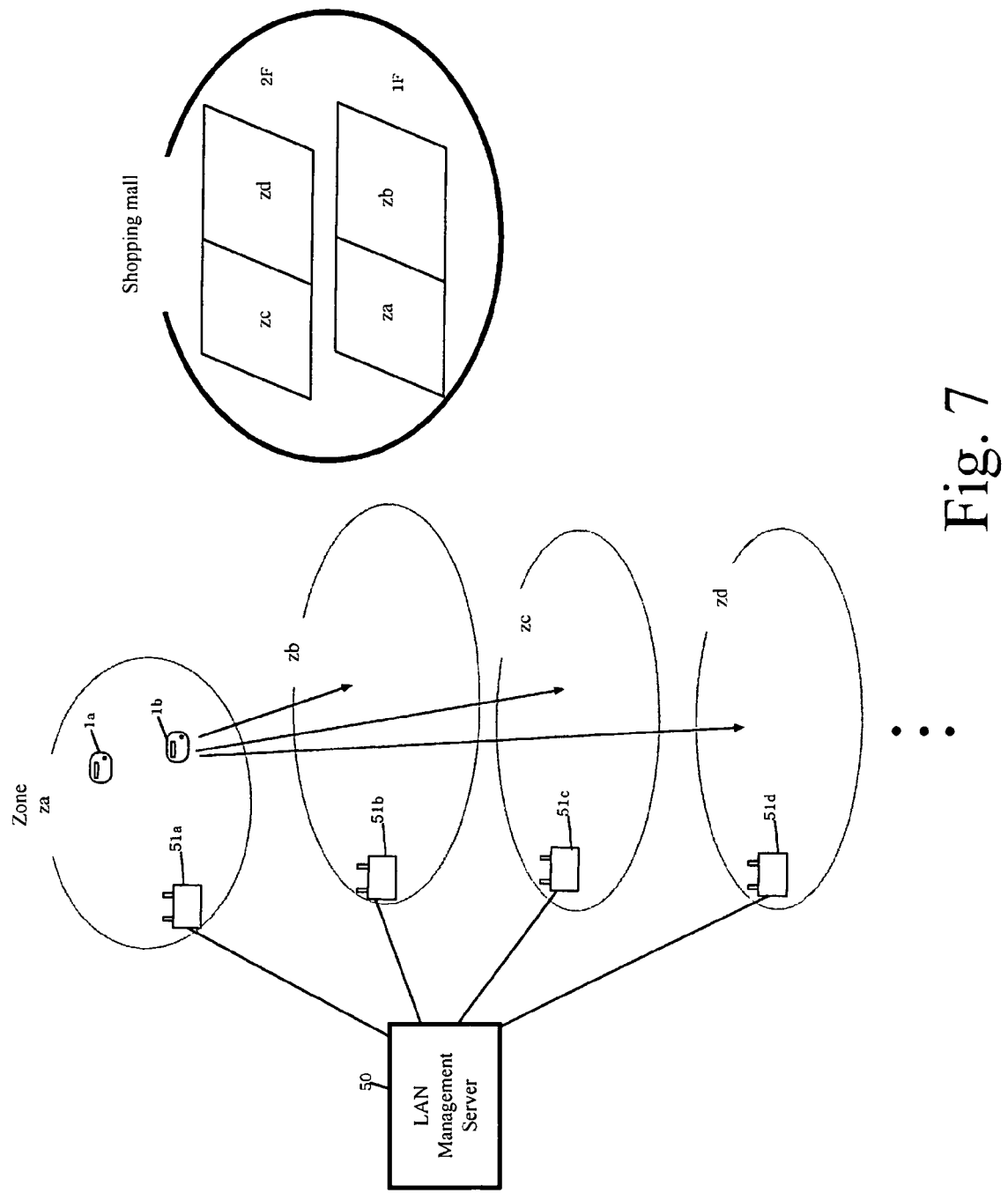
FIG. 7 is a schematic view illustrating a second aspect in the structure of a system for a wireless LAN communication method, which defines a travel bound area of a wireless LAN terminal device, according to the second embodiment.

FIG. 6 and FIG. 7 are schematic views illustrating the structure of a system that uses a wireless LAN communication method in accordance with a second preferred embodiment of the present invention. In this embodiment, the terminal devices 1a and 1b are grouped together, and a travel bound area of the terminal device 1b is defined. When the terminal device 1b is moved out of the travel bound area, the terminal device 1a is called.

In the system shown in FIG. 6, the travel bound area of the terminal device 1b is defined as the zone zb. In other words, the travel bound area of the terminal device 1b is defined as the communication bound area of the wireless base station 51b. Now, the following description will describe a case in which a mother as a guardian has the terminal device 1a, and a child has the terminal device 1b.

The management server 50 registers the defined travel bound area of the terminal device 1b as the zone zb (a bound area capable of communicating with the wireless base station 51b), and determines whether the terminal device 1b is in the travel bound area. Specifically, the determination is made based on whether the terminal device 1b changes its communications using the wireless base station 51b to another base station. Further, when the terminal device 1b cannot communicate with any base station, the determination is also made as the terminal device 1b has changed its communications with regards to the wireless base station 51b.

When the terminal device 1b moves from the zone zb to the zone za, zc, or zd, the management server 50 detects that the terminal device 1b is out of the travel bound area. The management server 50 extracts the terminal device 1a, which belongs to the same group as the terminal device 1b, and transmits a sound producing request signal to the terminal device 1a. The terminal device 1a produces an alarm sound, or the like, from the speaker 5, and can inform the mother that the child has moved out of the zone zb.

When the position data, and so on, relating to the terminal device 1b are transmitted similarly to the above embodiment, the terminal device 1a can display on the LCD panel 4 where the terminal device 1b has moved. In addition, while the terminal device 1a is called, a clerk of the shopping mall may be also informed that the child has moved out of the zone zb to search for him or her.

Further, the terminal device 1 having a defined travel bound area is not limited to one. It is possible to define travel bound areas for two or more terminal devices 1. When each of the children has one of the terminal devices 1a travel bound area is respectively defined. Thus, the mother can control the travel areas of her children. In this case, when the position data and the terminal device name of the terminal device 1b with the defined travel bound area are transmitted to the terminal device 1a and are displayed on the LCD panel 4, the mother can be informed which child has moved out of his or her zone, and to which zone he or she has moved. Additionally, the defined travel bound area is explained as one zone zb, however, a plurality of zones (for example, za and zb) may be defined as the travel bound areas.

According to this system, the travel bound area of the terminal device 1b can be controlled in a predetermined area. For example, children enjoy themselves in areas provided for them, such as a toy section or a plaza with games, while their guardians can enjoy shopping with a sense of security in another area. The terminal device 1 with the travel bound area defined in a toy section, a plaza for games, and so on, is distributed for lending.

In the system shown in FIG. 7, when the terminal device 1b moves to another zone, etc. away from the terminal device 1a, the terminal device 1a is called.

The travel bound area of the terminal device 1b is set to have the same zone as the terminal device 1a in the management server 50. For example, when the terminal device 1a is in the zone za, the travel bound area of the terminal device 1b is set as the zone za. Thus, when the terminal device 1a moves to the zone zb, the travel bound area of the terminal device 1b is set as the zone zb. The management server 50 determines whether the terminal device 1b is in the travel bound area. Specifically, the determination is made based on whether the terminal device 1b communicates with the same wireless base station 51a as the terminal device 1a. Further, when the terminal device 1b cannot communicate with any of the base stations, the determination is also made that the terminal device 1b cannot communicate with the same wireless base station 51a as the terminal device 1a.

In the case in which the terminal device 1a is in the zone za, when the terminal device 1b moves to the zone zb, the management server 50 detects that the terminal device 1b is out of the travel bound area, and transmits the sound producing request signal to the terminal device 1a. The terminal device 1a produces an alarm sound, or the like, from the speaker 5, and can inform the mother that the child has moved out of the same zone za. When the position data, and so on, relating to the terminal device 1b are also transmitted, similarly to the above embodiment, the terminal device 1a can display where the terminal device 1b has moved on the LCD panel 4. In addition, while the terminal device 1a is called, a clerk of the shopping mall may be also informed that the child has moved out of the zone za to search for him or her.

Further, the terminal device 1 having a defined travel bound area is not limited to one. It is possible to define travel bound areas for two or more terminal devices 1. When each of children has one of the terminal devices 1 with a defined travel bound area, the mother can control the travel areas of her children. In this case, when the position data and the terminal device name of the terminal device 1b with the defined travel bound area are transmitted to the terminal device 1a and are displayed on the LCD panel 4, the mother can be informed which child has moved out of the zone, and to which zone he or she has moved. Additionally, the defined travel bound area of the terminal device 1b is explained as the same zone as the terminal device 1a, however a plurality of zones (for example, za and zb) including the same zone may be defined as the travel bound areas. According to this system, the travel bound area of the terminal device 1b can be controlled based on its position relative to the terminal device 1a.

Third Embodiment

Figure 8:
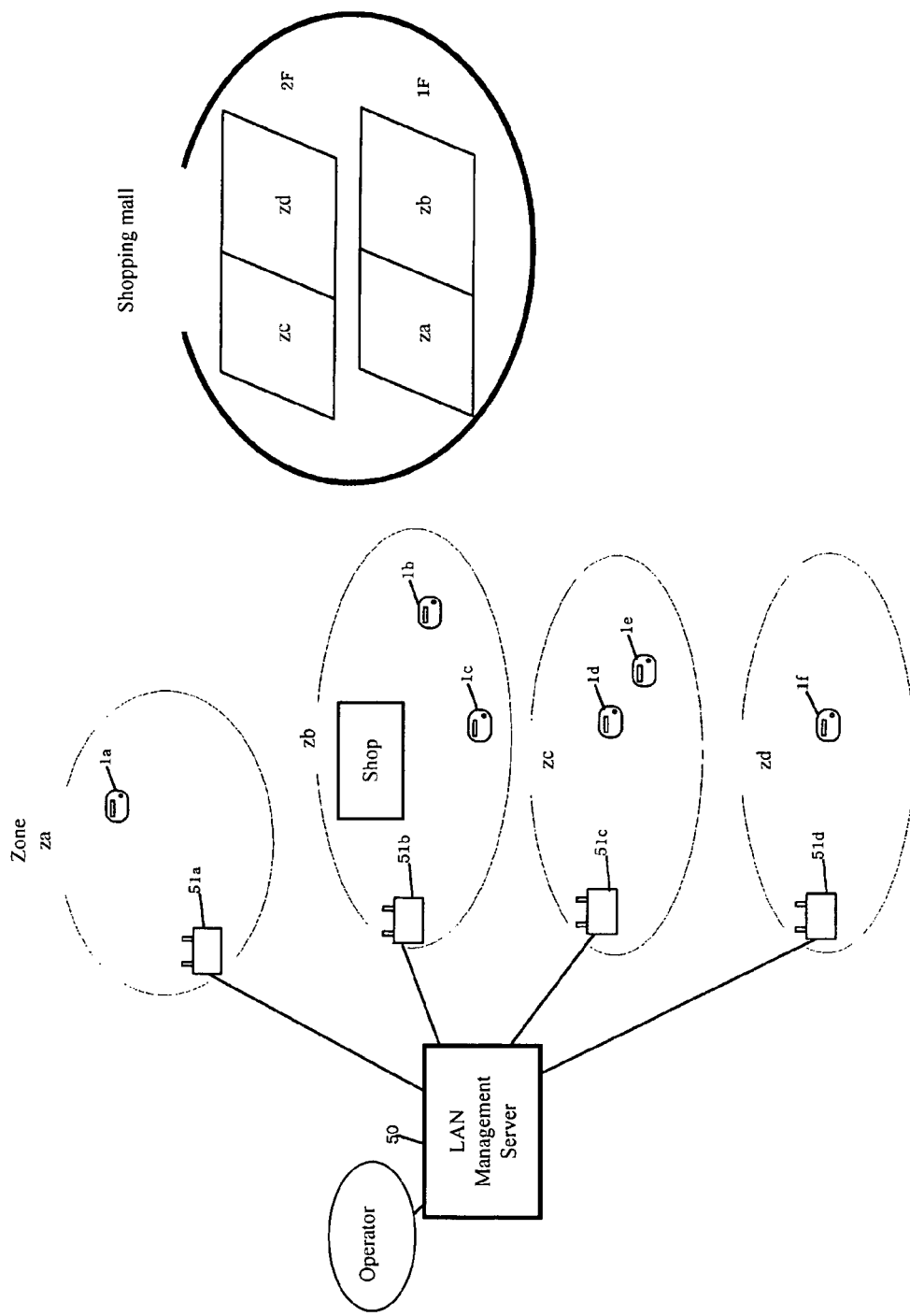
FIG. 8 is a schematic view illustrating the structure of a system for a wireless LAN communication method in which a LAN management server calls a wireless LAN terminal device in accordance with a third preferred embodiment of the present invention.

FIG. 8 is a schematic view illustrating the construction of a system that uses a wireless LAN communication method in accordance with a third preferred embodiment of the present invention. In this system, the management server 50 calls the terminal device 1 based on a request from the outside. For example, a shop, such as a restaurant in a shopping mall, has a plurality of terminal devices 1, and lends one of the terminal devices 1 to a user waiting his or her turn to be served. Then, the terminal device 1 is called based on the request from the shop. When a plurality of users is waiting as one group, one terminal device 1 may be lent to one member of the group, or a terminal device 1 may be lent to each member of the group.

The following description will describe the case in which an employee of a shop in the zone zb lends the terminal device 1a to a user having to wait. The user with the lent terminal device 1a can freely move in areas where the terminal device 1a can communicate with the wireless base station 51 both in the zone in which the shop is located and other zones until it is his or her turn to be served in the shop.

When it becomes the turn of the user with the lent terminal device 1a to be served, the shop requests the management server 50 to call the terminal device 1a by a terminal, such as a PC, connected to the management server 50, for example. The shop may also request an operator of the management server 50 to call the terminal device by communication means such as a telephone or a facsimile machine.

Upon receiving the request to call the terminal device 1a, the management server 50 transmits the sound producing request signal to the terminal device 1a through the wireless base station 51a. In the terminal device 1a receiving the sound producing request signal, the sound source LSI 12 generates an alarm sound, or the like, and emits it through the speaker 5. Thus, the user with terminal device 1a is informed that it is now his or her turn to be served, and can return to the shop calling the user.

According to this system, the terminal device 1 is lent to the user waiting his or her turn to be served in the shop. When it is his or her turn to be served an alarm sound, or the like, is produced by the speaker 5. Accordingly, the user can enjoy shopping freely in the mall without waiting in the shop until it is his or her turn to be served.

Fourth Embodiment

In this embodiment, the terminal device 1 attached to a mobile phone 20 is used in the wireless LAN system of any one of the first to third embodiments.

4-1. Mobile Phone

Figure 9A:
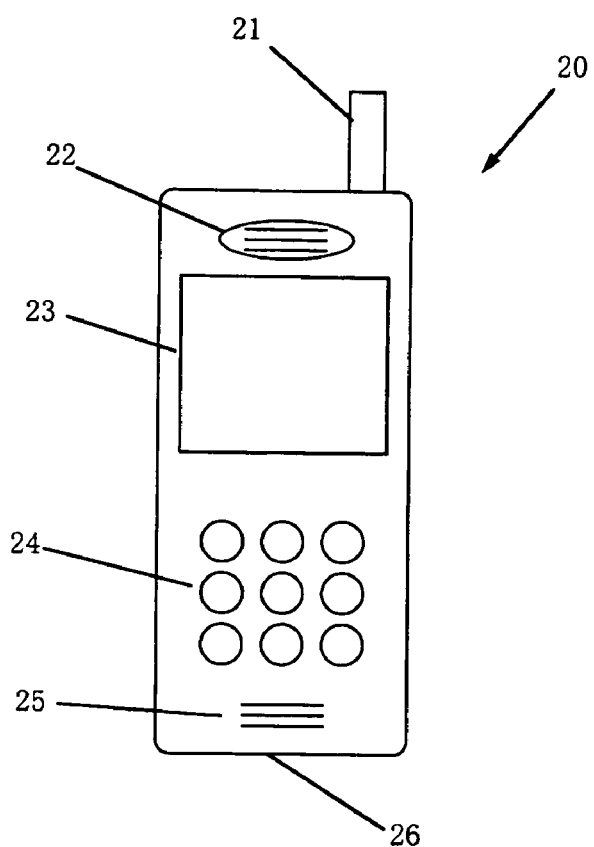
FIG. 9 is an external view of a mobile phone, and an external view of the mobile phone with a wireless LAN terminal device attached thereto in accordance with a fourth preferred embodiment of the present invention.
Figure 9B:
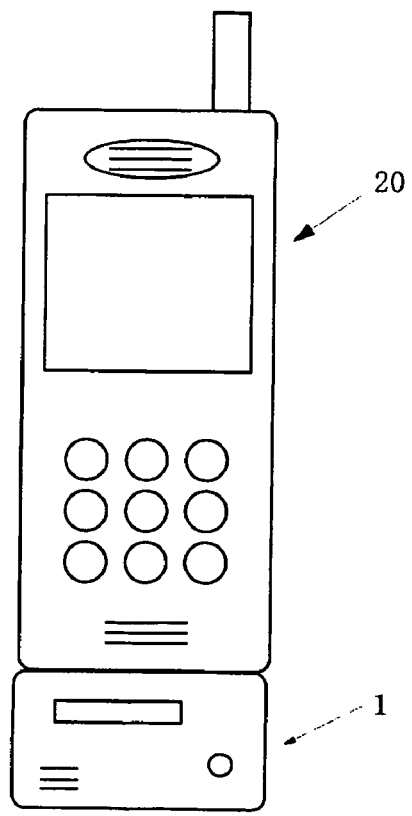
Figure 10:
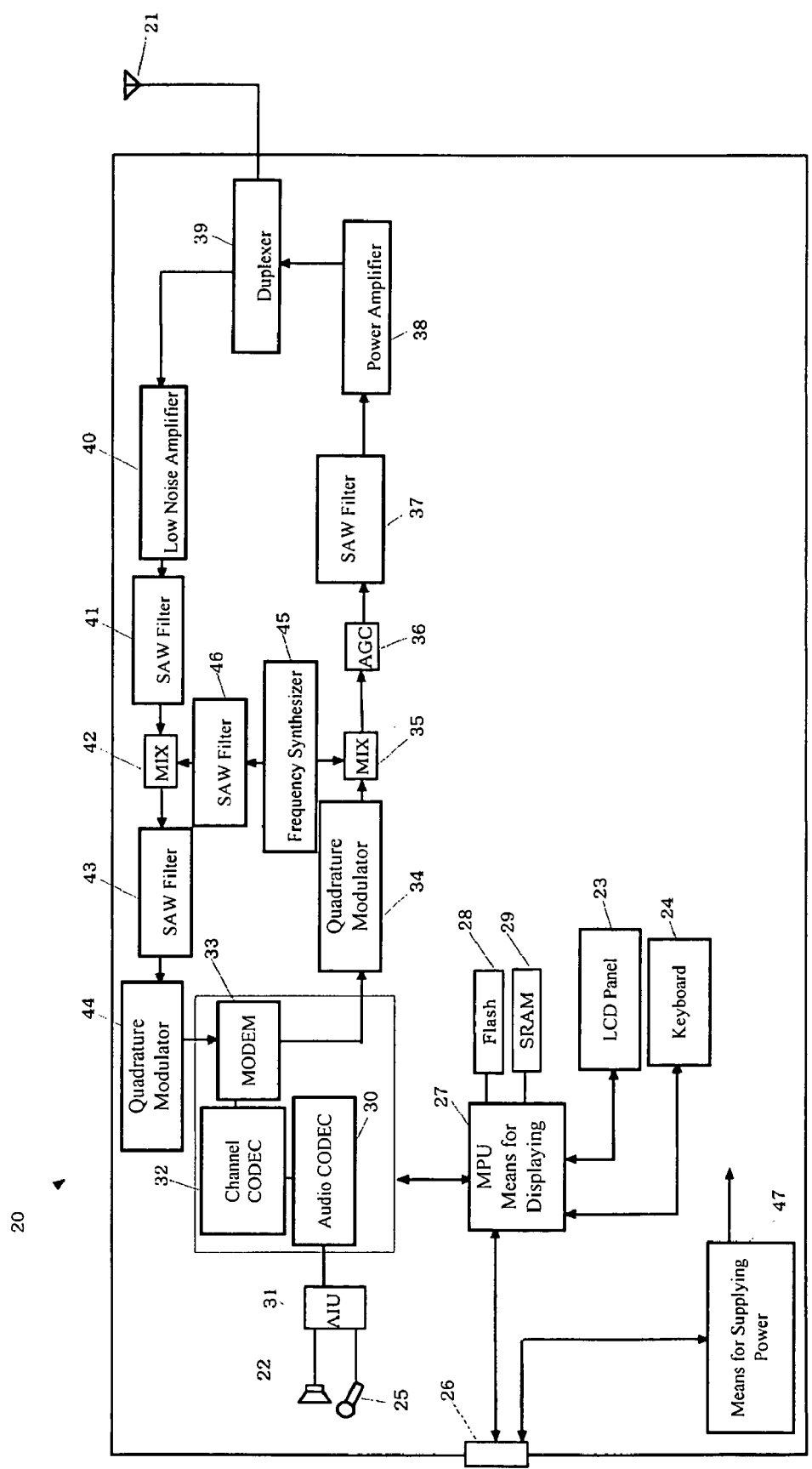
FIG. 10 is a view of a functional block diagram of the mobile phone according to the fourth embodiment.

FIG. 9(a) is an external view of a mobile phone 20, and FIG. 9(b) is an external view of the mobile phone 20 with a wireless LAN terminal device 1 attached thereto. FIG. 10 is a functional block diagram of the mobile phone 20.

As shown in FIG. 9(a), the mobile phone 20 includes an antenna 21 for transmitting and receiving a radio wave to and from a mobile phone circuit, a speaker 22 for producing sound, an LCD panel 23 used to display various kinds of data, a keyboard 24 used to receive operational input from a user, and a microphone 25 for sound input. In addition, the mobile phone 20 includes an external connecting terminal 26 capable of being directly connected to the connecting terminal 13 of the terminal device 1. The external connecting terminal 26 is provided to supply external electric power and to transmit and receive data. In this embodiment, as shown in FIG. 9(b), the connecting terminal 13 of the terminal device 1 is attached to the external connecting terminal 26 of the mobile phone 20, and is used to receive power and/or data.

As shown in FIG. 10, the mobile phone 20 includes a modem 33 for a telephone line connection, a channel codec portion 32, and a sound codec portion 30. The modem 33 performs modulation and demodulation of a signal to be transmitted and received. The channel codec portion 32 performs coding/decoding of a channel signal. The sound codec portion 30 performs coding/decoding of a sound signal.

In addition, the mobile phone 20 includes a quadrature modulator 34, an auto gain control portion 36, a SAW filter 37, a power amplifier 38, a duplexer 39, an antenna 21, a low noise amplifier 40, a SAW filter 41, a mixer 42, a SAW filter 43, a quadrature demodulator 44, a frequency synthesizer 45, and a SAW filter 46, as a signal transmitting/receiving function for mobile phone circuit connection.

The quadrature modulator 34 modulates a transmission signal into a high frequency signal. The frequency synthesizer 45 generates a signal of a predetermined frequency. The mixer 35 mixes an output signal of the frequency synthesizer 45 and an output signal of the quadrature modulator 34. The auto gain control portion 36 performs automatic gain control of an output signal of the mixer 35. The SAW filter 37 performs synchronization acquisition of the transmission signal. The power amplifier 38 amplifies the transmission signal. The duplexer 39 separately performs transmission and reception of the signal through the antenna 21. The antenna 21 transmits and receives the signal to and from the outside with the radio wave of the mobile phone circuit. The low noise amplifier 40 performs a low noise amplification of a received signal. The SAW filter 41 performs a synchronization acquisition of the received signal. The SAW filter 46 performs a synchronization acquisition of a signal generated from the frequency synthesizer 45. The mixer 42 mixes output signals of the SAW filters 41 and 46. The SAW filter 43 performs a synchronization acquisition of an output signal of the mixer 42. The quadrature demodulator 44 demodulates the received signal of a high frequency.

The mobile phone 20 includes the speaker 22, the microphone 25, and an AIU portion (audio interface portion) 31 as a function to produce sound and to receive voice (sound) from the users. The AIU portion 31 provides a sound signal (audio signal) from the audio codec portion 30 to the speaker 22, and provides a sound signal received from the microphone 25 to the audio codec portion 30. The speaker 22 externally produces the sound signal provided from the AIU portion 31 as sound. The microphone 25 receives voiced sounds from the outside, and converts them into sound signals, and provides them to the AIU portion 31.

A flash memory 28 is installed in a device body, and stores various kinds of data and programs. An SRAM 29 is a memory for providing workspace of an MPU 27. The MPU 27 is configured to control the whole operation of the mobile phone 20. The MPU 27 controls transmission and reception of sound or data through the mobile phone circuit, and executes the program stored in the flash memory 28. In addition, the MPU 27 transmits and receives a signal to and from the device connected to the outside through the external connecting terminal 26, and plays as a means for controlling display data on the LCD panel 23 based on the received signal. Additionally, the MPU 27 may act as a means for controlling sound produced by the speaker 22 based on the sound signal received from the external connecting terminal 26, and as a means for controlling input so that the input received from the keyboard 24 by the user is provided through the external connecting terminal 26 as an output signal.

Means for supplying power 47 supplies electric power to each portion from a battery removably attached to a phone body or a battery installed in the phone body, and charges the battery through the external connecting terminal 26. Moreover, the means for supplying power 47 may discharge the battery through the external connecting terminal 26.

4-2. System

Figure 11:
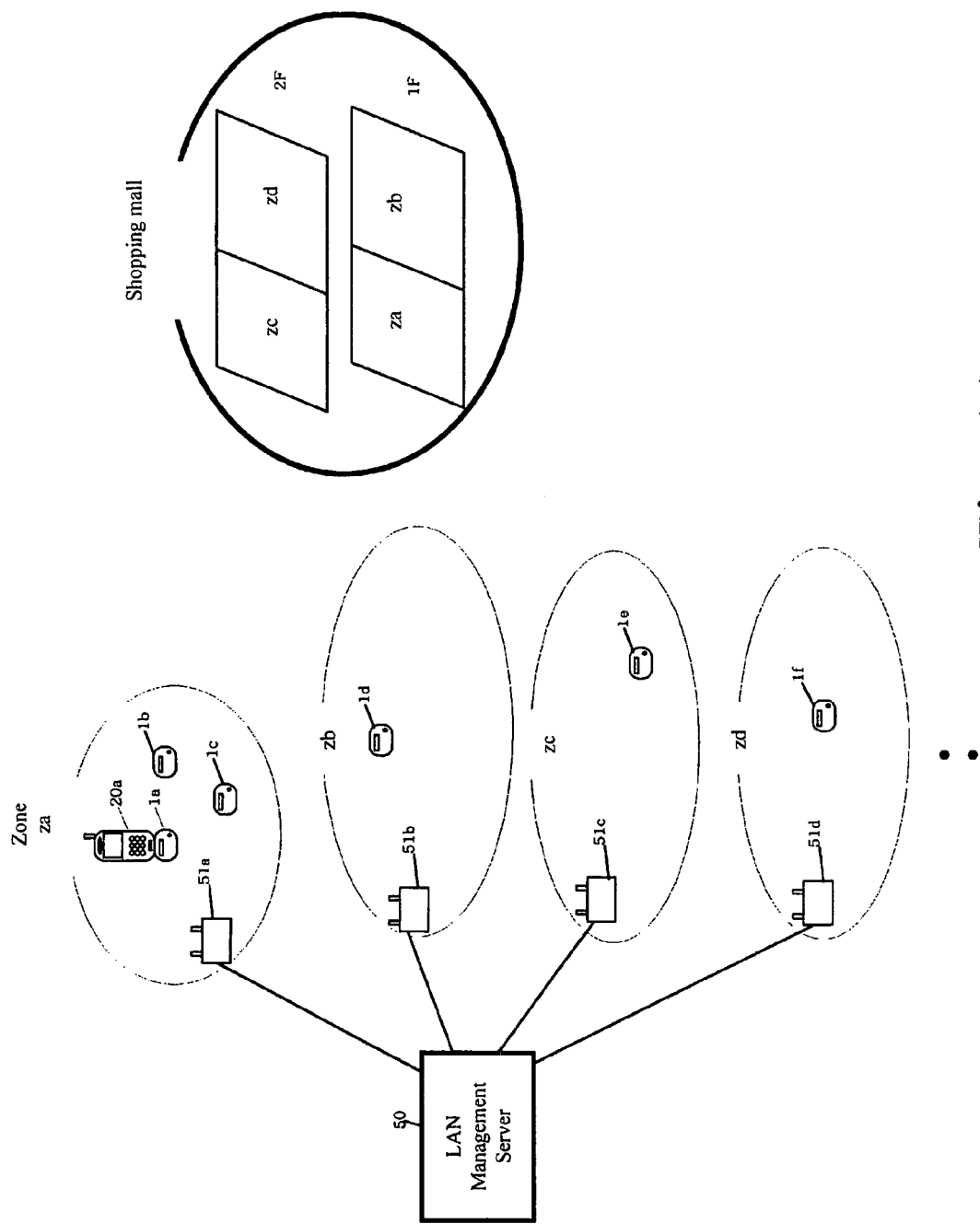
FIG. 11 is a schematic view showing the structure of a system using a wireless LAN terminal device with a mobile phone attached thereto according to the fourth embodiment.

FIG. 11 is a schematic view illustrating the structure of the system according to the combination of the first and fourth embodiments, when the terminal device 1a with the mobile phone 20a attached thereto is used. In this system, when the manual operation button 3 of the terminal device 1d is pressed, the sound producing request signal is transmitted to the management server 50 from the terminal device 1d through the wireless base station 51b. Similar to the first embodiment, the management server 50 retrieves data from other terminal devices 1a-1c, which belong to the same group, the position data (zone zb) and the terminal device name (terminal name 1d) of the terminal device 1d. In addition, the management server 50 generates map data indicating the position of the terminal device 1d based on the position data of the terminal device 1d. The management server 50 transmits the sound producing request signal, the terminal device name, and the map data to the terminal devices 1a-1c through the wireless base station 51a.

Figure 12:
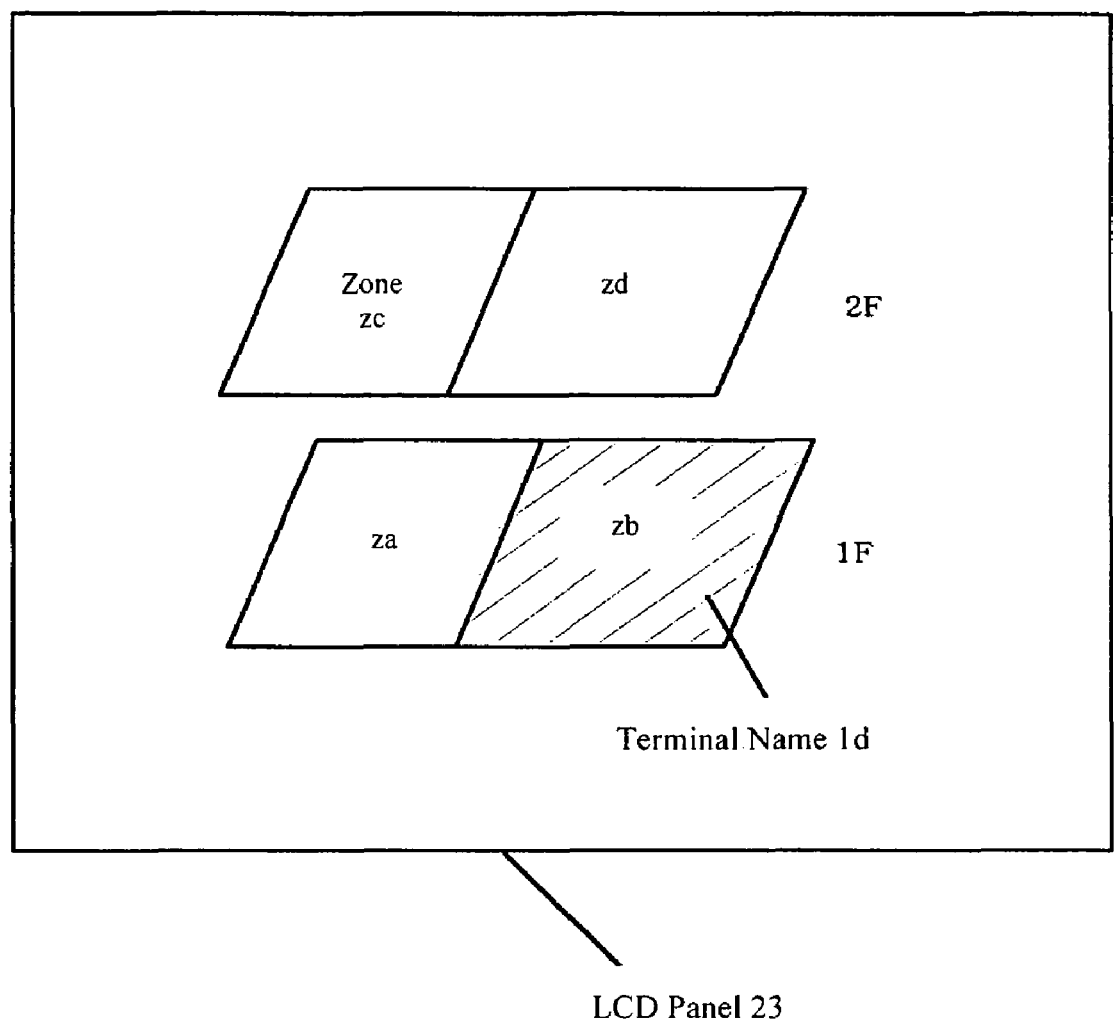
FIG. 12 is a view of an example of display on a screen of a mobile phone according to the fourth embodiment.

The terminal device 1a produces an alarm sound, or the like, based on the sound producing request signal, and transmits the terminal name and the map data to the mobile phone 20a through the connecting terminal 13. As shown in FIG. 12, in the mobile phone 20a, the MPU 27, which receives the terminal name and the map data as the means for controlling display, displays the terminal name and the map data on the LCD panel 23. Thus, the user with the terminal device 1a can easily know the position of the terminal device 1d based on the map.

Similarly, in the wireless LAN system according to the combination of the second and fourth embodiments, when the mobile phone 20 is attached to the terminal device 1a, it is possible to display where the terminal device 1b moves on the LCD panel 23 of the mobile phone 20.

In addition, in the wireless LAN system according to the combination of the third and fourth embodiments, when the mobile phone 20 is attached to the terminal device 1a, which is lent by the shop, it is possible to display the location of the shop on the LCD panel 23 of the mobile phone 20.

Additionally, in the case that the management server 50 transmits data, such as an advertisement, to the terminal device 1a when the terminal device 1a is not called by other terminal devices, the data, such as an advertisement, can be displayed on the LCD panel 23 of the mobile phone 20. When the MPU 27 plays a role as the means for controlling input, data relating to articles, and so on, are displayed, and an article can be selected by the keyboard 24, for example. Thus, it is possible to sell articles through the wireless LAN circuit. Furthermore, when the MPU 27 acts as the means for controlling sound, it is possible to play music, such as of a CD, through the speaker 5 of the terminal device 1 or the speaker 22 of the mobile phone 20 for a test-listen. Furthermore, an original game of an establishment, such as a shopping mall, may be distributed. The user can enjoy the game using the LCD panel 23, the keyboard 24, and the speaker 22 of the mobile phone 20.

4-3. Operation/Working-Effect

When the terminal device 1 is attached to the mobile phone 20, data received by the terminal device 1 through the wireless LAN circuit can be displayed on the LCD panel 23 of the mobile phone 20. In the combinations of the first and fourth or the second and fourth embodiments, when a map is displayed on the LCD panel 23 of the mobile phone 20, it is possible to know the location showing the position of the terminal device 1, which calls another device, without searching the map installed in the shopping mall, etc. for its position. For example, if a child moves out of the travel bound area, it is possible to search immediately for the child using a map displayed on the LCD panel 23.

In the wireless LAN system according to the embodiment 3, when a map is displayed on the LCD panel 23 of the mobile phone 20, the user can easily know the location of the shop.

Moreover, since the terminal device 1 is attached to the mobile phone 20 through the existing external connecting terminal 26, the existing mobile phone 20 can be used as it is when the function of the means for controlling display is configured by software in the MPU 27.

Fifth Embodiment

The LCD panel 23, the keyboard 24, and speaker 22 of the mobile phone 20 are used in the fourth embodiment, however, a device attached to the terminal device 1 is not limited to these. The device attached to the terminal device 1 may be an external connection device including at least means for displaying, such as a LCD panel as a user interface in accordance with a fifth preferred embodiment of the present invention.

Figure 13B:
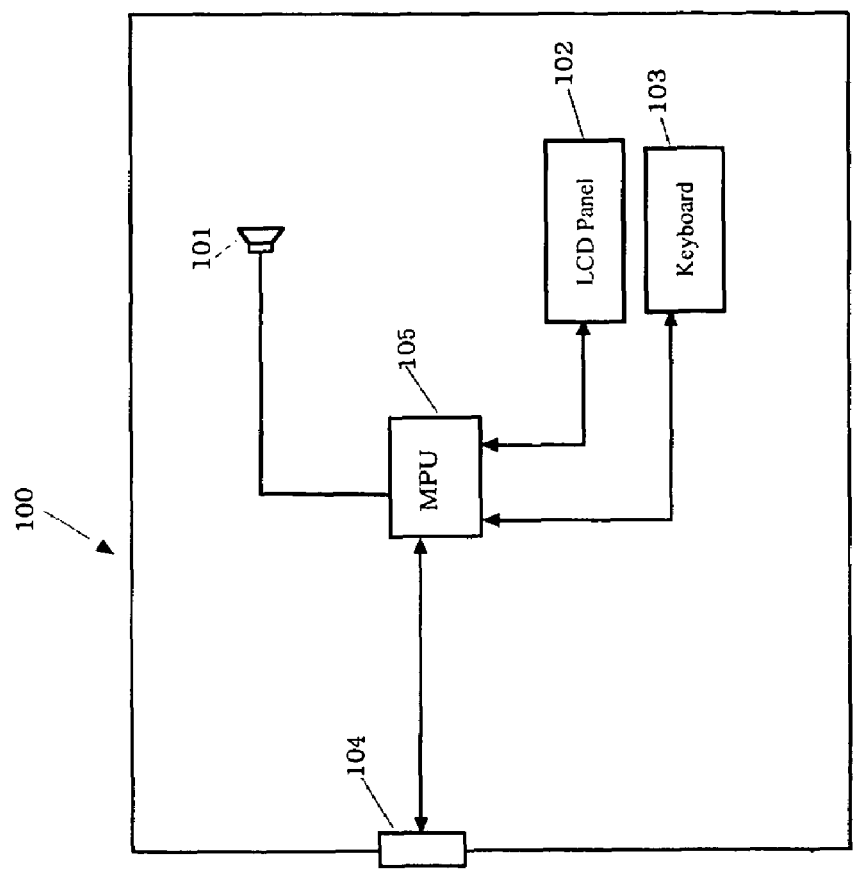
FIG. 13($a$) is a view of a mobile phone type external connection device in accordance with a fifth preferred embodiment of the present invention.
Figure 13A:
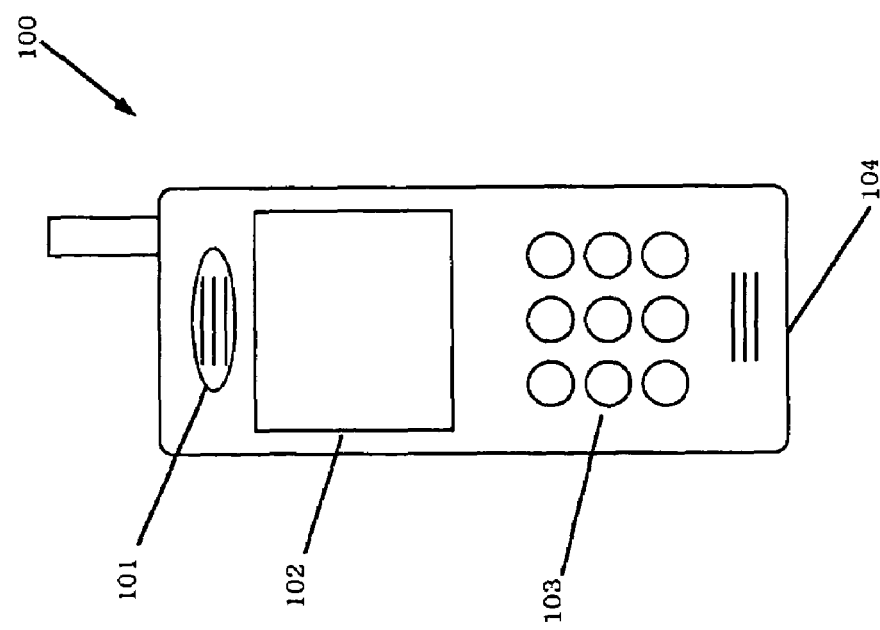

FIGS. 13(a) and 13(b) show a mobile phone type external connection device 100. This mobile phone type external connection device 100 has the shape of a mobile phone, but does not have the usual functions of a mobile phone, such as a function for connecting to a mobile phone circuit. The mobile phone type external connection device 100 includes a speaker 101, an LCD panel 102 and a keyboard 103 as a user interface, an external connecting terminal 104, and an MPU 105. The external connecting terminal 104 is a terminal directly attachable to the connecting terminal 13 of the terminal device 1.

When the mobile phone type external connection device 100 is attached to the terminal device 1, and is used, data received by the terminal device 1 through the wireless LAN circuit can be displayed on the LCD panel 102 for indication, similar to the fourth embodiment. Further, the sound signal can be produced by the speaker 101, and the input received from the keyboard 103 by the user can be transmitted through the wireless LAN circuit from the terminal device 1. Further, when it is not necessary to produce sound, or when sound is produced by the speaker 5 of the terminal device 1, the speaker 101 may be omitted. In addition, when it is not necessary to receive the input by the user in the mobile phone type external connection device 100, the keyboard 103 may be omitted.

Figure 14B:
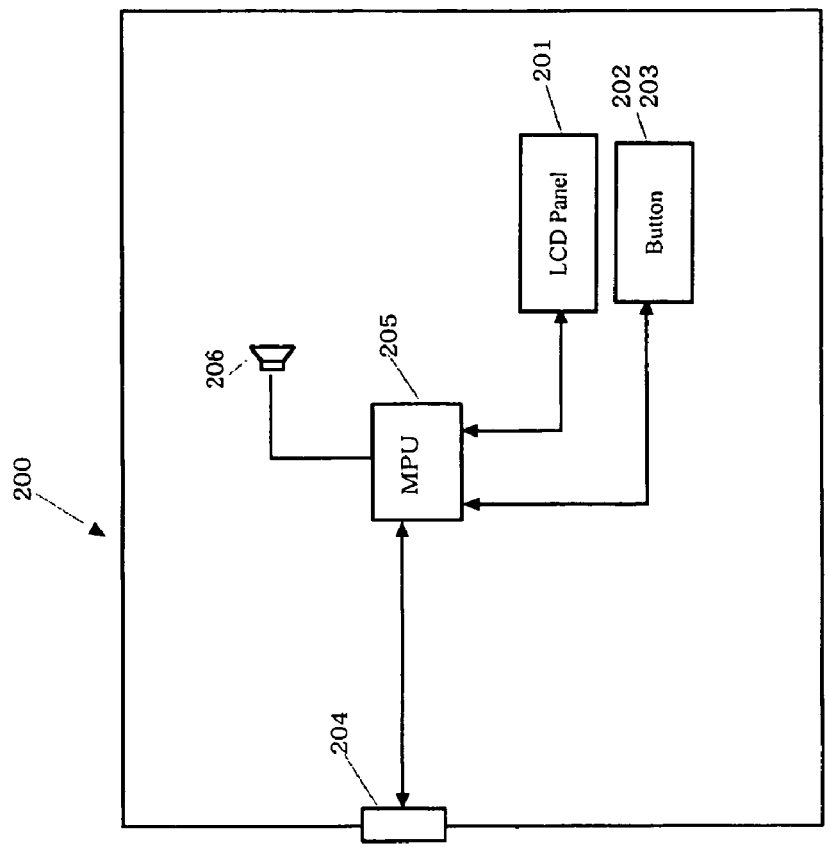
FIG. 14($a$) is a view of a portable game terminal device with an external connection device according to the fifth embodiment.
Figure 14A:
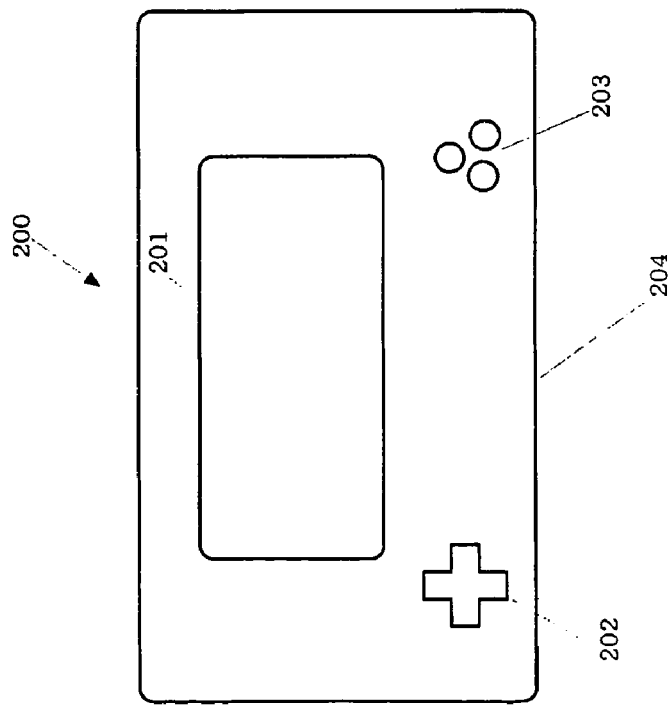

FIGS. 14(a) and 14(b) show a hand-held game machine type external connection device 200. This game machine type external connection device 200 includes an LCD panel 201, manual operation buttons 202 and 203, and a speaker 206 as a user interface, an external connecting terminal 204, and an MPU 205. The external connecting terminal 204 is a terminal directly attachable to the connecting terminal 13 of the terminal device 1.

This game machine type external connection device 200 can be used similarly to the mobile phone type external connection device 100. Specifically, when a game is received through the wireless LAN circuit and is played, it is possible to operate the device easily.

In addition, the terminal device 1 may be connected to an external connecting terminal of a commercial portable game terminal device. In this case, it is also possible to obtain a similar effect to the fourth embodiment by using an LCD panel, a keyboard, a speaker, and so on, of the portable game terminal device.

In the above description, the mobile phone type and the game machine type devices are used as the external connection device attached to the terminal device 1, however, devices of any shape that include at least means for displaying may be used.

Sixth Embodiment

Figure 15:
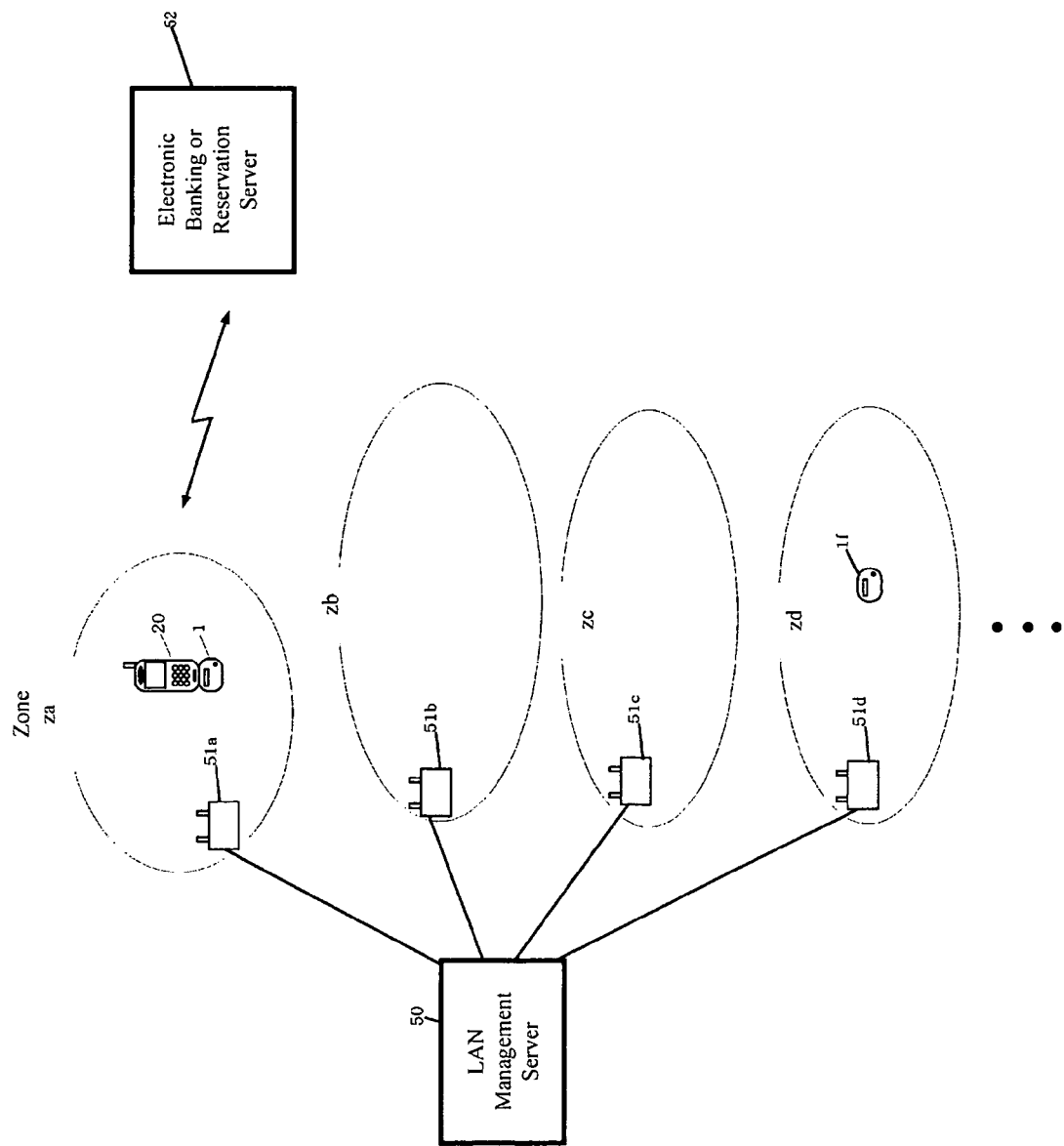
FIG. 15 is a schematic view showing the structure of a system, which uses a method for providing service using a wireless LAN terminal device in accordance with a sixth preferred embodiment of the present invention.

FIG. 15 is a schematic view illustrating the structure of a system that realizes a method for providing service in accordance with a sixth preferred embodiment of the present invention. In this system, the terminal device 1 is attached to the mobile phone 20, and communication by the terminal device 1 through the wireless LAN circuit and communication by the mobile phone 20 through the mobile phone circuit are switched.

A wireless LAN system can be simply realized at a low cost. Accordingly, in the case that a push type information service is provided to users in an establishment, such as a shopping mall, the establishment side can bear the cost of communication to provide such service to users for free. In addition, the data transmission speed of a wireless LAN system is high, and is suitable for the transmission and reception of large amounts of data. However, the wireless LAN system has a relatively low reliability with regards to connectivity and security. Therefore it is not suitable to transmit and to receive highly confidential data. On the other hand, in a mobile phone circuit, construction cost and management cost of the system are high. Thus, communication charges are also high. However, a mobile phone circuit is highly reliable. Therefore, it is suitable to transmit and to receive highly confidential data. In this embodiment, the advantages of both circuits are effectively used by switching these circuits with different characteristics to transmit and to receive data. In FIG. 15, the management server 50 transmits service data to the terminal device 1. The service data include data relating to trade of an article or service, data relating to a reservation of an article or service, questionnaire to a user, and so on.

The terminal device 1 transmits received data to the mobile phone 20, and then the mobile phone 20 displays the data on the LCD panel 23. The user can watch the data displayed on the LCD panel 23, and can purchase or reserve the article or service. The article or service is selected using the keyboard 25, and then data necessary for payment of a purchase price or reservation are transmitted. Since such data usually include highly confidential data, such as personal information, the mobile phone 20 connects to an electronic banking or a reservation server 52 through the mobile phone circuit, and then transmits the data necessary for payment of a purchase price or reservation. The data necessary for payment of a purchase price or reservation may be data inputted with the keyboard 25 by the user, data saved in the terminal device 1 or the mobile phone 20, or data in combination with both kinds of data.

According to this system, a service provider, such as a shopping mall, can provide service of article trade, etc. through the less expensive wireless LAN circuit. The user can receive a large amount of data by using the wireless LAN system without being concerned about communication charges. Additionally, when highly confidential data, such as personal information, are transmitted and received, the user can access a service for safely paying a purchase price by using the reliable mobile phone circuit. Furthermore, the mobile phone circuit is used for new services, thus, this system can increase communication charge revenues for the mobile phone service operator. When the management server 50 stores the purchase history of an article, the data relating to articles can be effectively provided by using this purchase history.

Moreover, the user is provided with data relating to an article by push type service through the wireless LAN circuit. If the user wants the article, he or she can make a payment through the reliable mobile phone circuit. In the case that the user inputs a time to pick up the article, whether he or she needs wrapping, the kind of wrapping, etc. the user can pick up the article with a desired wrap immediately when visiting the shop at the informed time.

Seventh Embodiment

Figure 16:
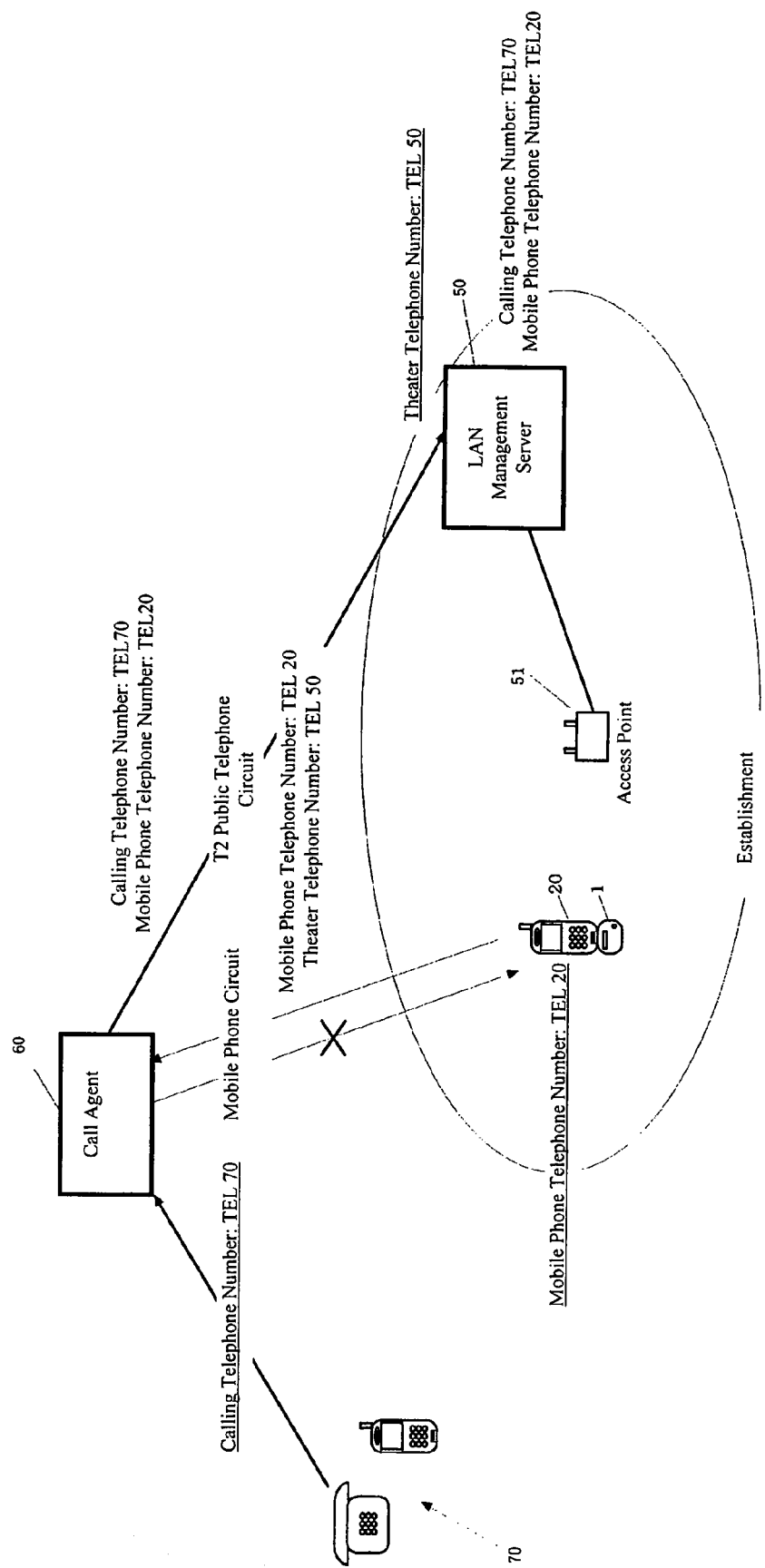
FIG. 16 is a schematic view showing an incoming-call transfer service system for a mobile phone using a wireless LAN terminal device in accordance with a seventh preferred embodiment of the present invention.

FIG. 16 is a schematic view illustrating the structure of an incoming-call transfer service system for a mobile phone using a wireless LAN terminal device 1 in accordance with a seventh preferred embodiment of the present invention. The LAN management server 50 is installed in an establishment where use of a mobile phone is restricted, such as a movie theater or an art museum, and is connected to the wireless base station 51 by a wireless or a cable LAN network. A call agent 60 is a server managed by a communication operator of mobile phone service and is connected to a public telephone circuit (the mobile phone circuit and a fixed-line telephone circuit). The terminal device 1 is managed in the establishment and lent to a user, who visits the establishment.

Figure 17:
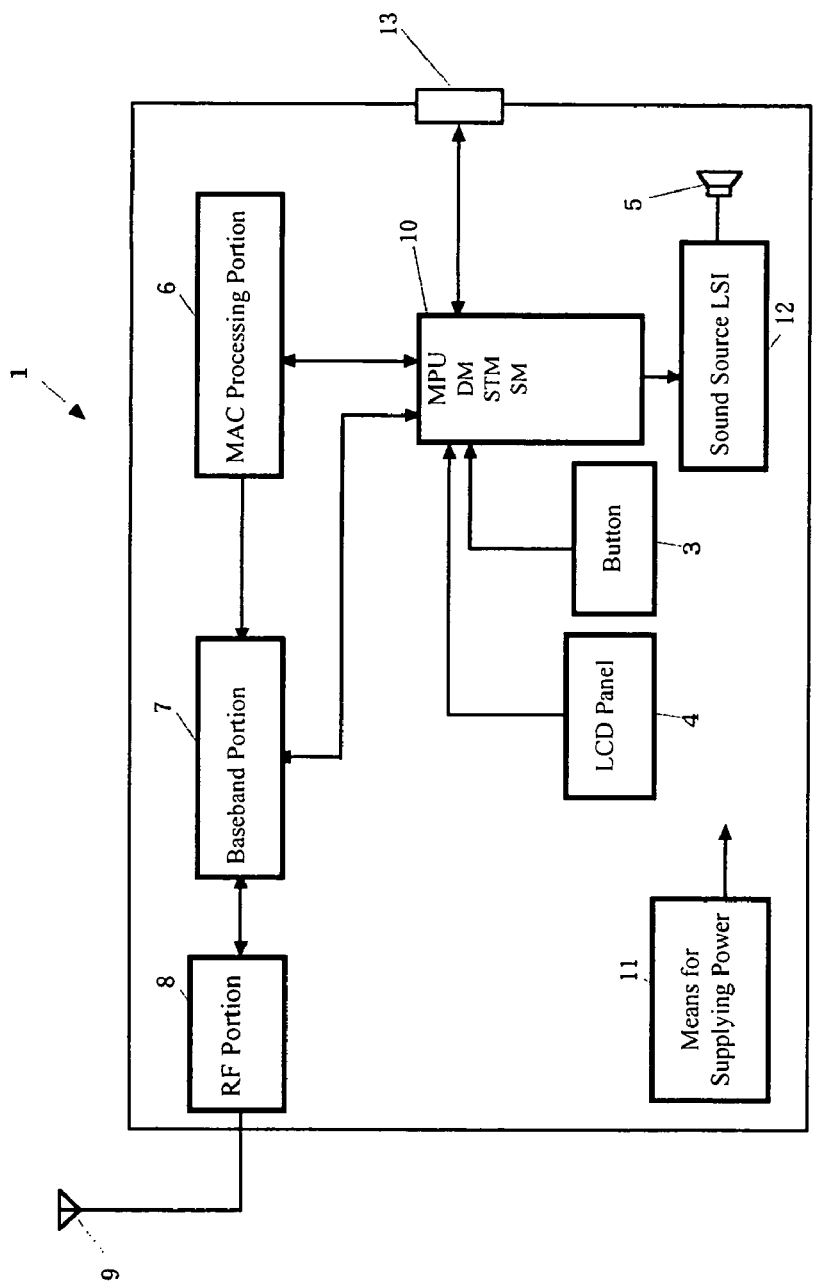
FIG. 17 is a view of a functional block diagram of a wireless LAN terminal device, which performs an incoming-call transfer service according to the seventh embodiment.

As shown in FIG. 17, the terminal device 1 includes means for detecting that the external connecting terminal 26 of the mobile phone 20 is attached to the connecting terminal 13 of the wireless LAN terminal device 1, means for setting transfer of an incoming call by controlling the mobile phone 20 when the detecting means detects that the external connecting terminal 26 is attached to the connecting terminal 13, and means for stopping radio wave transmission and reception of the mobile phone 20 after the transfer of an incoming call is set. The MPU 10 acts as a means for detecting (detecting means, DM), the means for setting transfer of an incoming call (setting transfer means, STM), and the means for stopping (stopping means, SM).

The following description will describe the incoming-call transfer service system.

Referring now to FIGS. 16 and 17, when the user attaches the terminal device 1 lent in the establishment to his or her mobile phone 20, the means for detecting detects the attachment, and the terminal device 1 begins to set the transfer of an incoming call. The terminal device 1 acquires a telephone number TEL 20 of the mobile phone 20, and transmits it to the management server 50 through the wireless base station 51. The management server 50 generates a telephone number list, in which the IP address and the telephone number TEL 20 of the terminal device 1 correspond to each other.

The terminal device 1 controls the mobile phone 20, and connects it to the call agent 60 through the mobile phone circuit. Then, the telephone number TEL 20 and a transferred telephone number (a telephone number TEL 50 of the management server 50) are registered in the call agent 60, and the telephone number TEL 20 is set to transfer an incoming call by the terminal device 1. After setting the telephone number TEL 20 to transfer an incoming call, the terminal device 1 stops radio wave transmission and reception of the mobile phone 20.

When the telephone number TEL 20 receives an incoming call from another telephone 70 (telephone number TEL 70), the call agent 60 transfers the incoming call directed to the telephone number TEL 20 to the telephone number TEL 50. Specifically, the call agent 60 transfers the time of the incoming call, the calling telephone number TEL 70, and the transfer telephone number TEL 20 to the management server 50 through the public telephone circuit.

When receiving the transfer of an incoming call the management server 50 retrieves the IP address of the terminal device 1 attached to the transfer telephone number TEL 20 based on the telephone number list. The management server 50 creates e-mail containing the incoming call time, the calling telephone number TEL 70, and the transfer telephone number TEL 20, and transmits it to the terminal device 1 through the wireless base station 51. The terminal device 1 receives the e-mail, and then the mobile phone 20 displays it on the LCD panel 23.

As mentioned above, the user can be informed of the incoming call from the telephone number TEL 70 to the mobile phone 20 (telephone number TEL 20), and its incoming call time.

In addition, the management server 50 transmits various kinds of service data, such as preliminary advertisement of movie, information on various discount services in the case of a movie theater, or information on the various events in the case of an art museum, for example. The terminal device 1 receives the various kinds of service data, and then the mobile phone 20 displays them on the LCD panel 23, and produces them from the speaker 22. Even if transmission and reception of the radio wave of the mobile phone 20 are stopped, the terminal device 1 can receive data from the management server 50. Accordingly, the user can receive the push type information service on the LCD panel 23 and from the speaker 22 of the mobile phone 20 through the terminal device 1. When it is necessary to restrict the sound produced by the mobile phone 20 and the terminal device 1, the data transmitted by the management server 50 cannot contain a sound signal.

In the case of an establishment where use of a mobile phone is restricted is in a large-scale establishment, such as a shopping mall, the management server 50 may be a server that manages a LAN system for the whole shopping mall.

In this incoming-call transfer service system, when the terminal device 1 is attached to the mobile phone 20, the terminal device 1 sets the mobile phone 20 into the incoming-call transfer service, and automatically stops radio wave transmission and reception of the mobile phone 20. Accordingly, in an establishment where use of a mobile phone is restricted, it is not necessary to switch off manually the mobile phone 20, or to set manually the mobile phone 20 to a manner mode (silent mode). When an incoming call is directed to the mobile phone 20, the management server 50, which received the transfer of an incoming call from the call agent 60, transmits e-mail to the terminal device 1, and the mobile phone 20 displays the e-mail. Thus, even if radio wave transmission and reception of the mobile phone 20 are stopped, the user can be informed the incoming call directed to the mobile phone 20 through the wireless LAN circuit.

Eighth Embodiment

Figure 18:
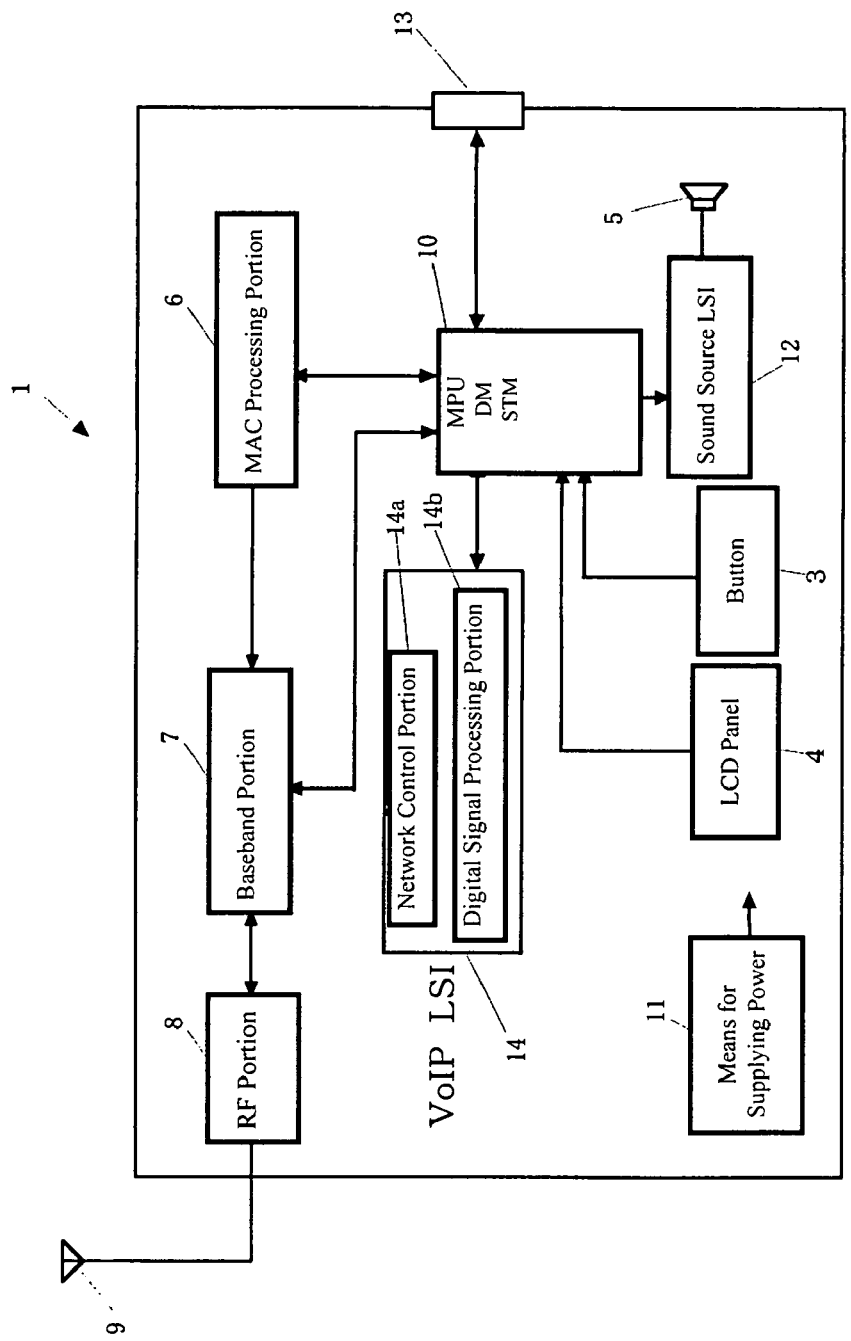
FIG. 18 is a view of a functional block diagram of a wireless LAN terminal device with a VoIP function in accordance with an eighth preferred embodiment of the present invention.
Figure 19:
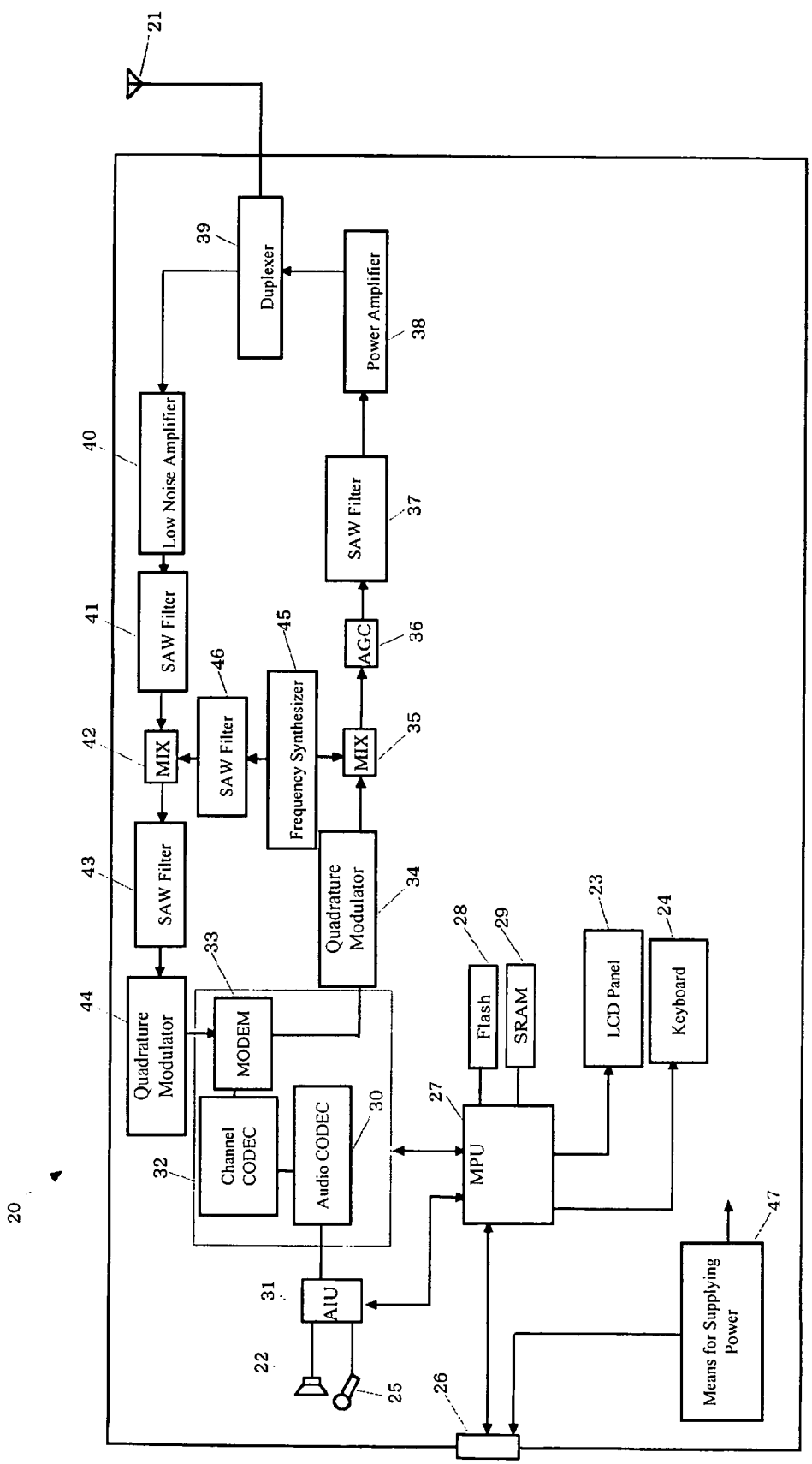
FIG. 19 is a view of a functional block diagram of a mobile phone with a wireless LAN terminal device attached thereto with a VoIP function according to the eighth embodiment.

FIG. 18 is a functional block diagram of a wireless LAN terminal device 1 in accordance with an eighth preferred embodiment of the present invention. FIG. 19 is a functional block diagram of the mobile phone 20, according to the eighth embodiment. When the local telephone is switched from a cable phone to a wireless IP phone in a business office, or the like, there are problems that arise. This embodiment is aimed at solving those problems. When a wireless IP phone system is constructed, an existing mobile phone cannot be used as a wireless IP phone machine as it is. Accordingly, it is necessary to buy many IP phones, thus, increasing costs to the user. In addition, the user needs to have both a wireless IP phone and a mobile phone, thus, having two or more telephones. On the other hand, a mobile phone can have a wireless IP phone function. However, battery life of such a mobile phone is short due to the problem of current consumption. A long life battery may require the battery to be larger. When a mobile phone has a wireless IP phone a function, it is necessary to shield each portion in order to prevent interference between radio waves used for the mobile phone circuit and the wireless LAN circuit. This causes the cost of such a mobile phone to increase. In this embodiment, a VoIP LSI 14 is provided in the terminal device 1, whereby connecting the terminal device 1 to the mobile phone 20 can achieve IP phone communication through the wireless LAN circuit.

As shown in FIG. 18, the terminal device 1 includes the VoIP LSI 14. The VoIP LSI 14 transmits and receives a sound signal based on control of the MPU 10 through the connecting terminal 13. The VoIP LSI 14 includes a network control portion 14a and a digital signal processing portion 14b. The network control portion 14a converts data into and from a packet. The digital-signal-processing portion 14b performs predetermined processing including codec (coding, decoding) processing of a digital sound signal. The terminal device 1 includes means for detecting whether the connecting terminal 13 is attached to the external connecting terminal 26, and means for stopping radio wave transmission and reception of the mobile phone 20 when the detecting means detects the attachment. The MPU 10 acts as these means for detecting and the means for stopping.

As shown in FIG. 19, the mobile phone 20 provides the digital sound signal, which is received from the external connecting terminal 26 by the MPU 27, to the AIU portion 31, and produces it from the speaker 22. The mobile phone 20 transmits the sound signal, which is received by the microphone 25, to the MPU 27 through the AIU portion 31. Further, the MPU 27 provides the sound signal to the terminal device 1 through the external connecting terminal 26.

In the terminal device 1 and the mobile phone 20, when the terminal device 1 is attached in the mobile phone 20, radio wave transmission and reception of the mobile phone 20 are stopped, and the terminal device 1 transmits and receives a sound packet through the wireless LAN circuit and uses the microphone 25 and the speaker 22 of the mobile phone 1 as a user interface. Thus, the terminal device 1 and the mobile phone 20 compose an IP phone communication machine. On the other hand, the terminal device 1 is removed from the mobile phone 20 when using the mobile phone circuit. Further, since the speaker 22 and the microphone 25 of the mobile phone 20 are used as a user interface, the sound source LSI 12 and the speaker 5 of the terminal device 1 may be omitted.

Figure 20:
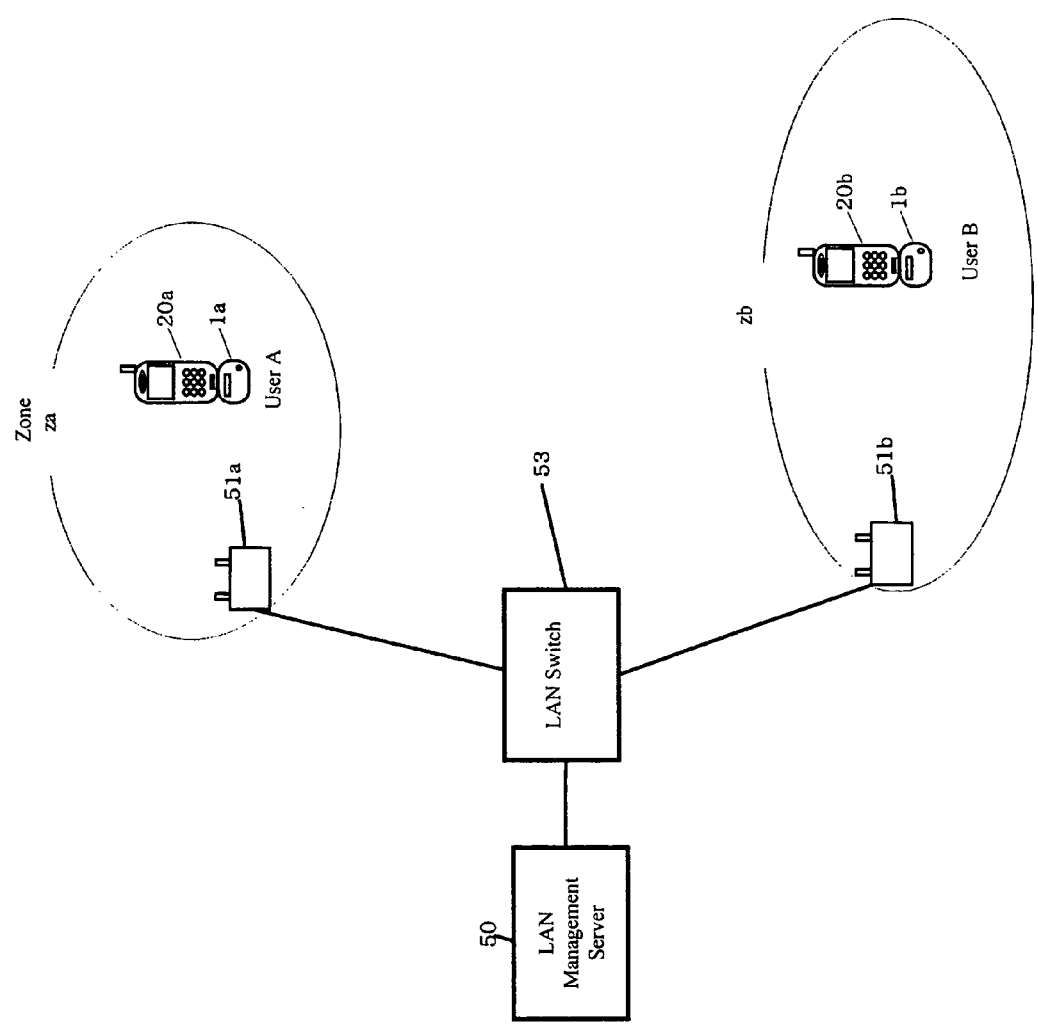
FIG. 20 is a view of a functional block diagram of an IP phone system that uses the wireless LAN terminal device and the mobile phone with a VoIP function according to the eighth embodiment.

FIG. 20 is a schematic view illustrating the structure of an IP phone system composed of the terminal device 1 and the mobile phone 20. This IP phone system includes the management server 50, a LAN switch 53, a plurality of wireless base stations 51a-51b connected to the management server 50, the terminal device 1a connected to the mobile phone 20a, and the terminal device 1b the connected to mobile phone 20b. The management server 50 controls the wireless LAN switch 53. The LAN switch 53 exchanges the IP phone circuit between the terminal device 1a and the terminal device 1b. The zones za-zb in the figure are communication bound areas of the wireless base stations 51a-51b, respectively.

Referring now to FIGS. 18, 19, and 20, in this IP phone system, the sound received by the microphone 25 of mobile phone 20a is converted into a packet by the VoIP LSI 14 of the terminal device 1a, and is transmitted to the terminal device 1b through the wireless base station 51a, the LAN switch 53, and the wireless base station 51b. In the terminal device 1b, the IP packet is converted into the sound signal by the VoIP LSI 14, and is produced by the speaker 22 of the mobile phone 20b. On the other hand, the sound received by the microphone 25 of the mobile phone 20b is converted into a packet by the VoIP LSI 14 of the terminal device 1b, and is transmitted to the terminal device 1a through the wireless base station 51b, the LAN switch 53, and the wireless base station 51a. In the terminal device 1a, the packet is converted into the sound signal by the VoIP LSI 14, and is produced by the speaker 22 of the mobile phone 20a. Thus, the sound received by the microphone 25 of the mobile phone 20a is produced by the speaker 22 of the mobile phone 20b, and the sound received by the microphone 25 of the mobile phone 20b is produced by the speaker 22 of the mobile phone 20a. Accordingly, an IP phone call can be achieved by using the mobile phones 20a and 20b.

According to this embodiment, it is not necessary to prepare separately many wireless IP phones by connecting the terminal device 1 to the existing mobile phone 20. Further, an IP phone system can be simply constructed at a low cost only by connecting the wireless base station for a wireless LAN to an existing LAN system. The user does not need to have a separate IP phone other than the mobile phone 20. For example, in the local area network, the user can communicate by the mobile phone 20 with the terminal device 1 attached thereto in IP phone communication through the wireless LAN circuit. The user removes the terminal device 1 from the mobile phone 20 to communicate by using the mobile phone circuit, outside the local area network, or if he or she desires to communicate with the outside by the mobile phone 20 even in the local area network. Since the means for supplying power 11 is installed in the terminal device 1, the load on the battery of the mobile phone 20 does not increase, and the available time provided by the battery is not diminished. Accordingly, it is not necessary for the battery of the mobile phone 20 to be large. When the terminal device 1 is attached to the mobile phone 20, radio wave transmission and reception of the mobile phone 20 are stopped. When the mobile phone circuit is used, the terminal device 1 is removed from the mobile phone 20. Thus, it is possible to prevent interference between radio waves of the mobile phone circuit and the wireless LAN circuit. Accordingly, it is not necessary to provide a shield, which is required in the case of a mobile phone that has a wireless IP phone function. It is also possible to prevent and to control increases in size and cost for the mobile phone 20.

As mentioned above, the terminal device 1 and the mobile phone 20 are used for the local area network IP phone system. However, the terminal device 1 and the mobile phone 20 may be used for an IP phone network using a PHS circuit, the mobile phone circuit, and the fixed-line telephone circuit, or a network using the internet circuit in combination with these circuits.

(Codec)

Figure 21:
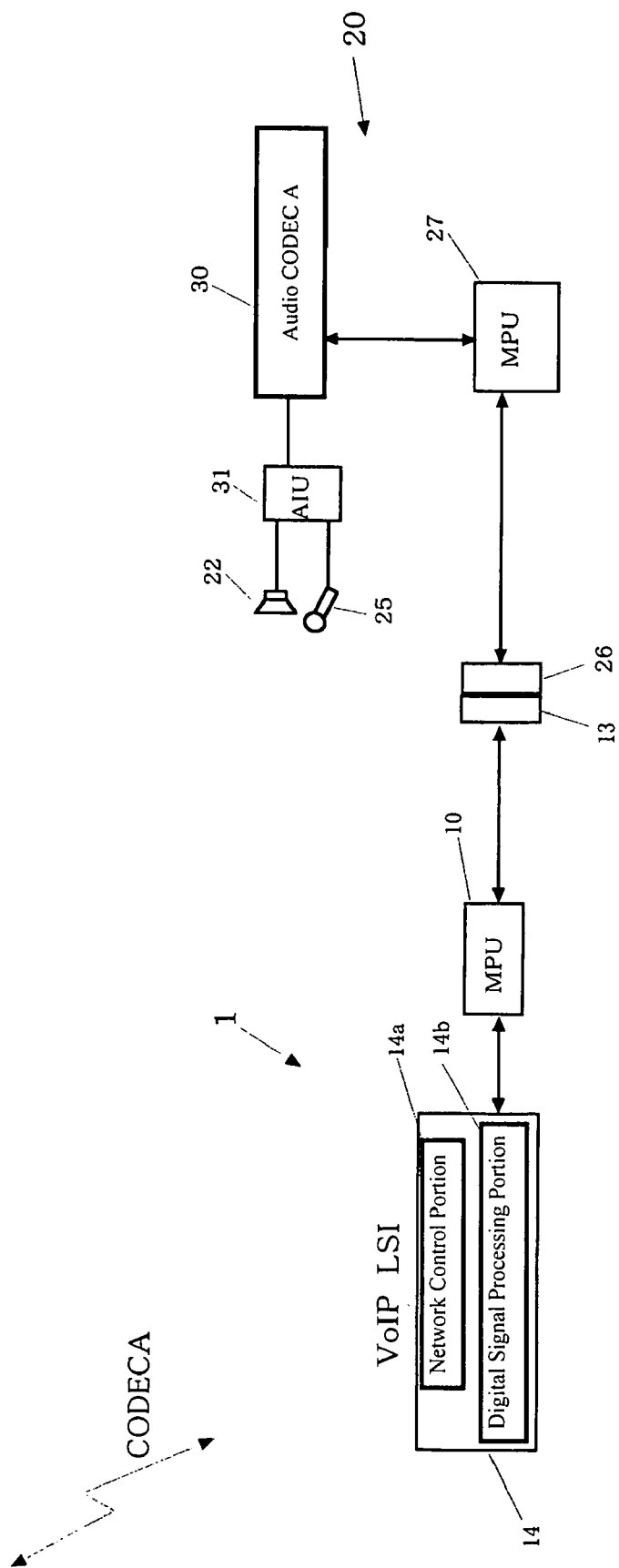
FIG. 21 is a schematic view provided to explain codec processing for the wireless LAN terminal device and the mobile phone with a VoIP function according to the eighth embodiment.
Figure 22:
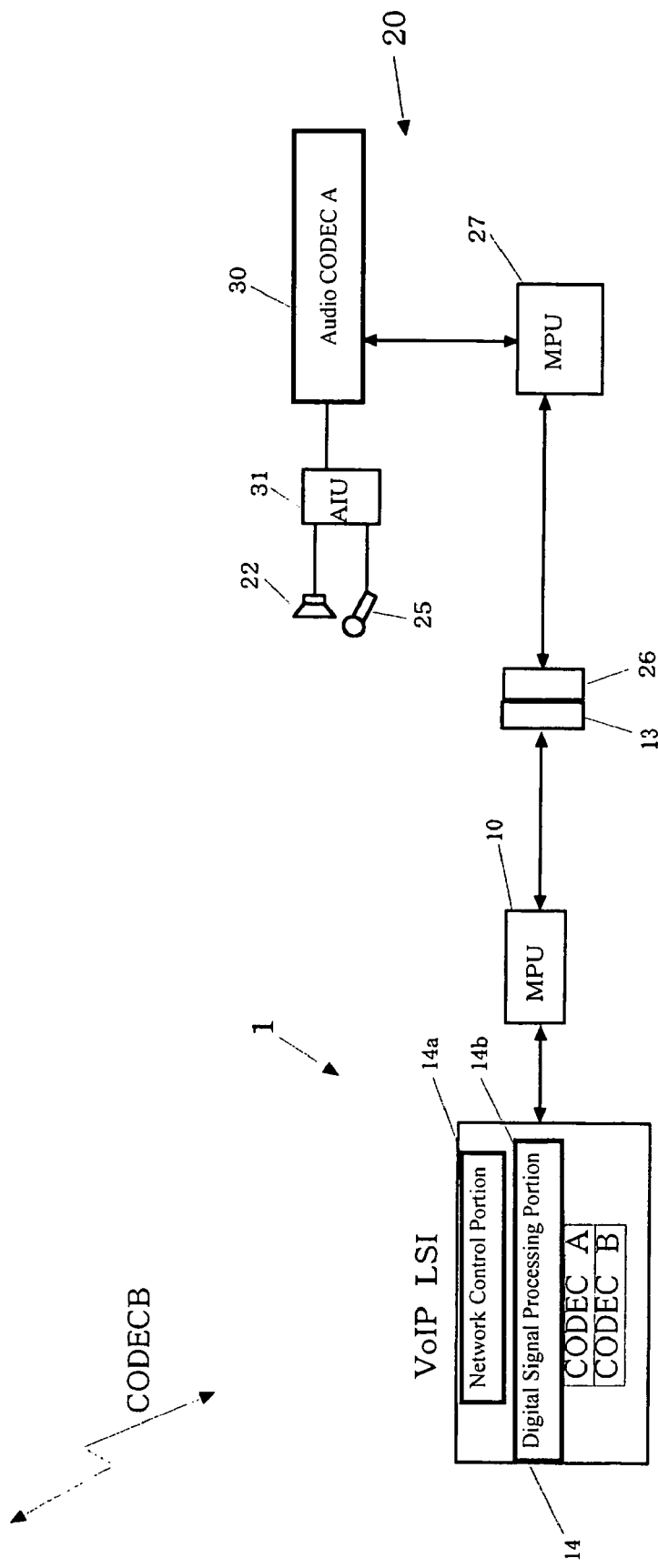
FIG. 22 is a schematic view provided to explain further the codec processing for the wireless LAN terminal device and the mobile phone with a VoIP function.

FIG. 21 and FIG. 22 is a schematic views provided to explain processing of the sound signal of the IP phone by using the sound codec 30 of the mobile phone 20.

FIG. 21 shows a case in which the sound codec 30 of the mobile phone 20 corresponds to codec A, when the party on the other end transmits and receives only a sound signal coded based on codec A. In this case, the digital-signal-processing portion 14b of the VoIP LSI 14 of the terminal device 1 does not perform codec processing of the digital sound signal, but the sound codec 30 of the mobile phone 20 performs codec processing. In this case, the function of the codec of the digital-signal-processing portion 14b can be omitted.

FIG. 22 shows a case in which the sound codec 30 of the mobile phone 20 corresponds to codec A, although the party on the other end transmits and receives only a sound signal coded based on codec B. In this case, functions of codec A and B are necessary for the digital signal processing portion 14b of the VoIP LSI 14. When the terminal device 1a receives a sound signal of codec B, the sound signal is decoded based on codec B, then is coded based on codec A in the VoIP LSI 14 (digital-signal-processing portion 14b), and subsequently, is transmitted to the mobile phone 20. In the mobile phone 20, the sound signal is decoded by the sound codec 30 based on codec A, and is produced by the speaker 22. On the other hand, a sound signal, which is received by the microphone 25 of the mobile phone 20, is coded based on codec A by the sound codec 30, and is transmitted to the terminal device 1. In the terminal device 1, the sound signal, which is coded based on codec A, is decoded based on codec A, and then is coded based on codec B, and is transmitted subsequently. In this case, it is possible to communicate even if the party on the other end can transmit and receive a sound signal only coded based on codec B.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-431726. The entire disclosure of Japanese Patent Application No. 2003-431726 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A portable wireless LAN terminal device comprising:
   a device body being attachable to an external connecting terminal installed in a portable external connection device;
   a transmitting and receiving unit which transmits and receives a signal through a wireless LAN circuit;
   a power supplying unit which supplies power to each portion from a power accumulating unit installed in said device body or a power accumulating unit being removably attachable to said device body;
   a connecting terminal installed in said device body and being attachable to said external connecting terminal; and
   a first sound producing unit which produces sound based on a signal received by said transmitting and receiving unit.

2. The wireless LAN terminal device according to claim 1, further comprising a first operation portion which receives input from a user.

3. The wireless LAN terminal device according to claim 1, wherein,
said external connection device is a mobile phone, and further comprising
a detecting unit which detects whether said connecting terminal is attached to said external connecting terminal,
a transfer setting unit which sets transfer of an incoming call by controlling said mobile phone when said detecting unit detects the attachment, and
a radio wave transmission and reception stopping unit which stops radio wave transmission and reception of said mobile phone after the transfer of an incoming call is set.

4. The wireless LAN terminal device according to claim 1, further comprising a sound packet processing portion installed in said device body which transmits and receives a sound packet to and from said transmitting and receiving unit, and which transmits and receives sound signals through said connecting terminal.

5. The wireless LAN terminal device according to claim 4, wherein,
said external connection device is a mobile phone, and further comprising
a detecting unit which detects whether said connecting terminal is attached to said external connecting terminal, and
a radio wave transmission and reception stopping unit which stops radio wave transmission and reception of said mobile phone when said detecting unit detects an attachment.

6. The wireless LAN terminal device according to claim 1, further comprising a display unit which displays data based on the signal received by said transmitting and receiving unit.

7. A portable data terminal system comprising:
a portable wireless LAN terminal device including,
a device body,
a transmitting and receiving unit which transmits and receives a signal through a wireless LAN circuit, said transmitting and receiving unit being installed in said device body,
a power supplying unit which supplies power to each portion of said portable wireless LAN terminal device from a power accumulating unit which accumulates power and is installed in said device body or a power accumulating unit which supplies power and is attachable to said device body,
a connecting terminal installed in said device body, and
a first sound producing unit which produces sound based on signals received by said transmitting and receiving unit; and
a portable external connection device including an external connecting terminal being attachable to said connecting terminal, and an interface portion which receives input data from a user and provides data for said user.

8. The portable data terminal system according to claim 7, wherein said wireless LAN terminal device further includes a first operation portion which receives input from said user.

9. The portable data terminal system according to claim 7, wherein said interface portion includes a second display unit which displays various kinds of data based on a signal received from said external connecting terminal.

10. The portable data terminal system according to claim 9, wherein said interface portion includes a second sound producing unit which produces sound based on a sound signal received from said external connecting terminal.

11. The portable data terminal system according to claim 9, wherein said interface portion further includes a second operation portion which receives input from said user.

12. The portable data terminal system according to claim 7, wherein said wireless LAN terminal device further includes a sound packet processing portion which transmits and receives a sound packet to and from said transmitting and receiving unit, and transmits and receives a sound signal through said connecting terminal, wherein
said interface portion further includes a sound producing unit which produces sound based on sound signals received from said external connecting terminal, and a sound input unit which receives sound input and converts received sound input into a sound signal.

13. The portable data terminal system according to claim 7, wherein said external connection device is a mobile phone.

14. A mobile phone comprising:
an external connecting terminal being attachable to a connecting terminal of a portable wireless LAN terminal device, said portable wireless LAN terminal device including,
a device body,
a transmitting and receiving unit which transmits and receives a signal through a wireless LAN circuit,
a power supplying unit which supplies power to each portion from a power accumulating unit which accumulates power and is installed in said device body or a power accumulating unit which accumulates power and is removably attachable to said device body,
a connecting terminal installed in said device body, and
a first sound producing unit which produces sound based on signals received by said transmitting and receiving unit;
a display unit which displays data based on a signal received from said external connecting terminal; and
a control unit which controls the display of data on said display unit.

15. The mobile phone according to claim 14, wherein said portable wireless LAN terminal device further includes a first operation portion which receives input from a user.

16. The mobile phone according to claims 14, further comprising,
a sound packet processing portion of said wireless LAN terminal device which transmits and receives a sound packet to and from said transmitting and receiving unit, and transmits and receives said sound signal through said connecting terminal,
a sound producing unit which produces sound based on a sound signal received by said external connecting terminal, and
a sound input unit which receives sound input and converts said received sound input into a sound signal.

17. A wireless LAN communication method comprising:
using at least first and second wireless LAN terminal devices which produce sound based on a sound producing request signal;
using a management device which communicates with said first and second wireless LAN terminal devices through a network including a wireless LAN circuit;
registering said first and second wireless LAN terminal devices after grouping said devices by said management device;

receiving said sound producing request signal from said first wireless LAN terminal device through said network by said management device;

retrieving said second wireless LAN terminal device grouped to the same group of said first wireless LAN terminal device; and transmitting said sound producing request signal to said retrieved second wireless LAN terminal device through said network by said management device.

18. The wireless LAN communication method according to claim 17, further comprising, using an external connection device which displays data received by said second wireless LAN terminal device, said external connection device being attached to said second wireless LAN terminal device, generating data indicating a position of said first wireless LAN terminal device by said management device, and transmitting said data to said second wireless LAN terminal device through said network by said management device.

19. The wireless LAN communication method according to claim 18, wherein said external connection device is a mobile phone.

20. A wireless LAN communication method comprising:

establishing communication between a portable wireless LAN terminal device which produces sound based on a sound producing request signal, and a management device which communicates with said wireless LAN terminal device through a network including a wireless LAN circuit;

receiving a request which transmits said sound producing request signal to said wireless LAN terminal device by said management device; and transmitting said sound producing request signal to said wireless LAN terminal device based on said request by said management device.

* * * * *